United States Patent
Palsule et al.

(10) Patent No.: US 8,327,102 B1
(45) Date of Patent: Dec. 4, 2012

(54) METHOD AND SYSTEM FOR NON-DISRUPTIVE MIGRATION

(75) Inventors: Anurag Palsule, Bangalore (IN); Shailaja Kamila, Bangalore (IN); James Voll, Palo Alto, CA (US); Ameet Deulgaonkar, Bangalore (IN); Nagender Somavarapu, Bangalore (IN)

(73) Assignee: Netapp, Inc., Sunnyvale, CA (US)

( * ) Notice: Subject to any disclaimer, the term of this patent is extended or adjusted under 35 U.S.C. 154(b) by 499 days.

(21) Appl. No.: 12/582,984

(22) Filed: Oct. 21, 2009

(51) Int. Cl.
*G06F 12/00* (2006.01)
*G06F 13/00* (2006.01)
*G06F 13/28* (2006.01)

(52) U.S. Cl. ...................... 711/165; 711/162
(58) Field of Classification Search .......... 711/161–162, 711/165
See application file for complete search history.

(56) References Cited

U.S. PATENT DOCUMENTS

| | | | |
|---|---|---|---|
| 6,931,410 B2 * | 8/2005 | Anderson et al. ............. 1/1 |
| 7,533,230 B2 * | 5/2009 | Glover et al. ............ 711/165 |
| 7,801,850 B2 * | 9/2010 | Moore et al. ............. 707/610 |
| 7,937,453 B1 * | 5/2011 | Hayden et al. ........... 709/219 |
| 2006/0074916 A1 * | 4/2006 | Beary ........................ 707/10 |
| 2008/0222644 A1 * | 9/2008 | Richards et al. .......... 718/104 |
| 2009/0249005 A1 * | 10/2009 | Bender et al. ............ 711/162 |

* cited by examiner

*Primary Examiner* — Jared Rutz
*Assistant Examiner* — Ryan Bertram
(74) *Attorney, Agent, or Firm* — Klein, O'Neill & Singh, LLP

(57) ABSTRACT

Method and system for processing client provisioning and migration requests is provided. The process evaluates a provisioning request and selects a storage that best meets the client requirements. The process determines if non-disruptive migration is possible and if it is possible then the storage is automatically configured for non-disruptive migration. Once the storage is provisioned and configured, the process receives a migration request to migrate information from the storage. The process determines an access protocol used by the client to access the storage. The process determines if a storage system that manages the storage is capable of supporting non-disruptive migration of information from the storage. If the storage system is capable, then a migration technique is automatically selected for migrating the information from the storage.

20 Claims, 25 Drawing Sheets

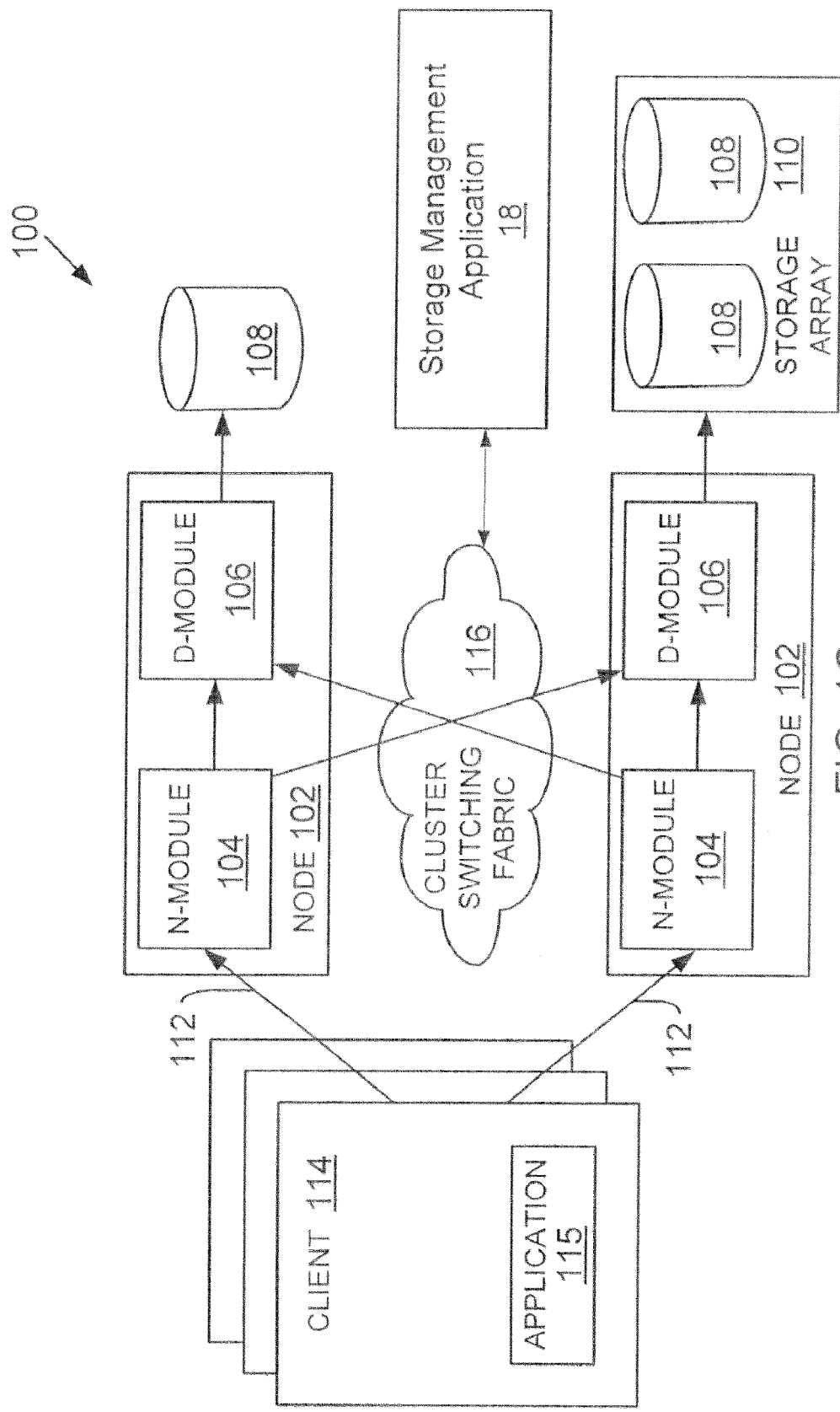

NetApp Management Console : Manage Data

File View Tasks Help

Group | Global

Dashboards

Data
> Datasets — 406
> Resource Pools — 402
> Unprotected Data

410

Data Resource Pools

Add | Edit | X Delete

| Name ▲ | Total Size | Free Size | Utilization | Owner ▽ | Description ▽ | Time |
|---|---|---|---|---|---|---|
| RP_149 | 227.08 GB | 112.69 GB | 50% | | | Defe |
| RP_15 | 113.54 GB | 3.17 GB | 97% | | | Defe |
| RP_16 | 454.15 GB | 302.93 GB | 33% | | | Defe |
| RP_201 | 113.54 GB | 5.07 GB | 96% | | | Defe |
| RP_202 | 85.11 GB | 57.35 GB | 33% | | | Defe |
| RP_203 | 56.74 GB | 29.67 GB | 48% | | | Defe |
| RP_205 | 56.74 GB | 36.69 GB | 35% | | | Defe |
| RP_51 | 681.21 GB | 491.76 GB | 28% | | | Defe |
| RP_55 | 113.52 GB | 86.20 GB | 24% | | | Defe |
| RP_Aggr | 113.54 GB | 98.52 GB | 13% | | | Defe |
| RP_misc | 113.54 GB | 105.38 GB | 7% | | | Defe |

404

Dependencies:

| Dependency | | Transparent migration capable |
|---|---|---|
| DC_16 — 408 | | No |
| test_ds | | No |

409 — Remaining number of transparent migration-enabled datasets allowed: 2

Resources | Space breakout | Dependencies

Policies
Hosts
System
Get Started

| IP Address | Netmask | Interface | VLAN |
|---|---|---|---|
|  |  | e0b | 3 |
|  |  | e0b | 4 |
|  |  | e0a [default-ips... ▽] |  |
|  |  | e0a [default-ipspace] |  |
|  |  | e0b [default-ipspace] |  |
|  |  | e0b-1 [default-ipspac |  |
|  |  | e0c [default-ipspace] |  |

542 — Dataset Migration Wizard - FinanceOracleDS

Interface Selection
Select interfaces on the destination storage system.

544

To continue, click Next.

< Back | Next > | Cancel

METHOD AND SYSTEM FOR NON-DISRUPTIVE MIGRATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Technical Field

The present disclosure relates to storage systems.

2. Related Art

Various forms of storage systems are used today. These forms include network attached storage (NAS) systems, storage area networks (SANs), and others. Network storage systems are commonly used for a variety of purposes, such as providing multiple users with access to shared data, backing up data (e.g., by data mirroring) and others.

A network storage system typically includes at least one computing system (may also be referred to as a "server"), which is a processing system configured to store and retrieve data on behalf of one or more client processing systems ("clients"). In the context of NAS, a storage server operates on behalf of one or more clients to store and manage shared files in a set of mass storage devices, such as magnetic or optical disks or tapes.

In a SAN context, the storage server provides clients with block-level access to stored data. Some storage systems may be capable of providing clients with both file-level access and block-level access.

Information stored at a storage system is often migrated from one storage volume (may be referred to as a "source volume") to storage volume (may be referred to as "destination volume"). While information is being migrated, there may be applications that may still want to use the source volume. It is desirable to migrate information in a non-disruptive manner (also referred to as non-disruptive (or transparent)) so that applications can continue to use the source volume and tasks associated with the source volume can be performed as well.

Storage systems use various protocols and migration technologies to move and secure information. A user typically has to configure and provision storage and then manually configure the migration process. Continuous efforts are being made to automate the migration process.

SUMMARY

In one embodiment, a method and system for processing client provisioning and migration requests is provided. The process evaluates a provisioning request and selects a storage that best meets the client requirements. The process determines if non-disruptive migration is possible and if it is possible then the storage is automatically configured for non-disruptive migration.

Once the storage is provisioned and configured, the process receives a migration request to migrate information from the storage (first storage) to a second storage. The process determines an access protocol used by the client to access the storage. The process then determines if a storage system that manages the storage is capable of supporting non-disruptive migration. If the storage system is capable, then a migration technique is automatically selected for migrating the information from the first storage to the second storage.

The embodiments disclosed herein have various advantages. For example, a storage administrator while provisioning storage does not have to manually select non-disruptive migration because the process and system does that automatically. Furthermore, based on the operating environment, an optimum migration technique is selected for migrating information.

In another embodiment, a machine implemented method for processing a migration request received from a client to migrate information from a first storage to a second storage is provided. The process determines an access protocol used by the client to access the first storage; and in response to the migration request, the process automatically determines if a storage system that manages the first storage is capable of supporting non-disruptive migration of information from the first storage to the second storage. If the storage system is capable, then a migration technique is automatically selected for migrating the information from the first storage to the second storage.

In yet another embodiment, a machine readable storage medium storing executable instructions, which when executed by a machine, causes the machine to perform a method for processing a migration request received from a client to migrate information from a provisioned first storage to a second storage is provided. The method includes (a) determining an access protocol used by the client to access the first storage; (b) in response to the client request, automatically determining if a storage system that manages the first storage is capable of supporting non-disruptive migration of information from the first storage to the second storage. If the storage system is capable, then a migration technique is automatically selected for migrating the information from the first storage to the second storage.

In another embodiment, a computer program product with a computer usable storage medium having computer readable instructions embodied therein for processing a migration request received from a client to migrate information from a provisioned first storage to a second storage is provided. The medium includes (a) instructions for determining an access protocol used by the client to access the first storage; (b) instructions for automatically determining if a storage system that manages the first storage is capable of supporting non-disruptive migration of information from the first storage to the second storage; (c) instructions for determining whether non-disruptive migration is possible, if the storage system is capable of supporting non-disruptive migration; and (d) instructions for automatically selecting a migration technique for migrating the information from the first storage to the second storage, if non-disruptive migration is possible and the storage system is capable of non-disruptive migration.

In another embodiment, a machine implemented method for provisioning storage for non-disruptive migration in response to a client request is provided. The method includes (a) evaluating the client request and determining an access protocol used by the client to access the storage; (b) determining if a storage system that manages the storage is capable of supporting non-disruptive migration of information from the storage; and (c) if the storage system is capable of supporting non-disruptive migration, then automatically configuring the storage for non-disruptive migration.

In yet another embodiment, a computing system for processing a migration request received from a client to migrate information from a provisioned first storage to a second storage is provided. The system includes a processing module executing instructions for providing a graphical user interface on a display device to a user for submitting the migration request. Based on the migration request, the processing module determines an access protocol used by the client to access the first storage; determines whether the storage system is capable of supporting non-disruptive migration; and then automatically selects a migration technique for migrating the information from the first storage to the second storage, if the storage system is capable of supporting non-disruptive migration.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended no illustrate, but not to limit the present disclosure. The drawings include the following Figures:

FIG. 1G shows a block diagram of a clustered system, according to one embodiment.

FIGS. 4A-4D show screen shots from a user interface for provisioning storage, according to one embodiment.

FIGS. 5A-5F and 6A-6F show screen shots from a user interface for non-disruptive migration, according to one embodiment.

DETAILED DESCRIPTION

Figure 1A:
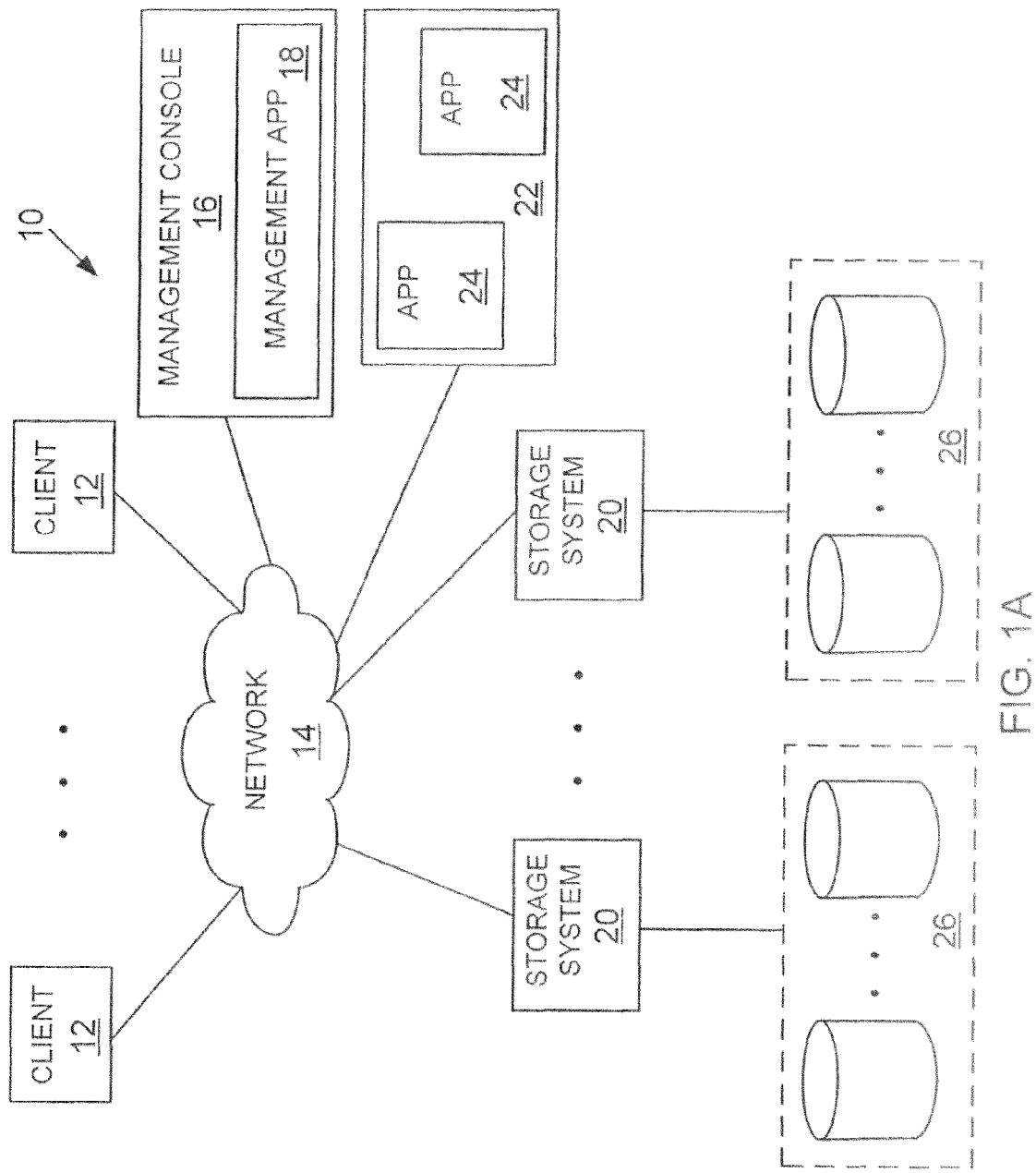
FIG. 1A shows a block diagram of a system using the embodiments disclosed herein.

Definitions:

The following definitions are provided as they are typically (but not exclusively) used in the computing/storage environment, implementing the various adaptive embodiments described herein.

"Access Protocol" means a standard/protocol/convention used by client systems to access stored information managed by a storage system. Examples of access protocols include FC, NFS, CIFS, iSCSI and others.

"Aggregate" is a logical aggregation of physical storage, i.e., a logical container for a pool of storage, combining one or more physical mass storage devices (e.g., disks) or parts thereof into a single logical storage object, which includes or provides storage for one or more other logical data sets at a higher level of abstraction (e.g., volumes).

"CIFS" means the Common Internet File System Protocol, an access protocol that client systems use to request file access services from storage systems over a network.

"Data Container" or "Dataset" means a block, a file, a logical unit of data or any other information.

"FC" means Fibre Channel, a high-speed network technology primarily used for storage networking. Fibre Channel Protocol (FCP) is a transport protocol (similar to Transmission Control Protocol (TCP) used in Internet Protocol ("IP") networks) which predominantly transports SCSI commands over Fibre Channel networks.

"Global Namespace" refers to a virtual hierarchical collection of unique volume names or identifiers and directory paths to the volumes, in which the volumes are stored on multiple server nodes within a clustered storage server system. In the context of the present disclosure, the global namespace of a clustered storage server system can be extended to include not only the identifiers of volumes stored on the multiple nodes of the clustered system, but also the identifiers of volumes stored on one or more storage systems that are remote from and do not constitute a part of the clustered system.

"iSCSI" means the Internet Small Computer System Interface, an IP based storage networking standard for linking data storage facilities. The standard allows carrying SCSI commands over IP networks. iSCSI may be used to transmit data over local area networks (LANs), wide area networks (WANs), or the Internet, and can enable location-independent data storage and retrieval.

"NDMP" means Network Data Management Protocol, a standard for transporting data between NAS and backup devices.

"Migration" means moving information stored at a first storage location to another storage location. Non-disruptive (or transparent) migration occurs when the first storage location can be accessed while information is being migrated to another location.

"NFS" means Network File System, a protocol that allows a user to access storage over a network.

"Provisioning" means setting aside and configuring a storage resource for a particular purpose. In one embodiment, a storage resource is configured such that it can accommodate a user need for storage, comply with an access protocol used by the user to access the storage resource and be able to handle non-disruptive migration.

"Resource Pool" means a collection of one or more storage systems and one or more aggregates, and its configuration is typically determined by a network storage administrator.

"Snapshot" (without derogation to any trademark rights of NetApp, Inc.) is a technique to prevent data loss in the event a physical storage device (e.g., a disk) fails in a file system. A snapshot captures the contents (referred to herein as "primary data") of the files and directories in a volume at a particular point in time, to allow subsequent recovery of that data if necessary (e.g., following an unintended deletion or modification of data). Snapshots can be copied to one or more volumes, which then can be used as a mirror or a collection of mirrors, and which can provide a back-up copy of the file system. When used in this way, a mirror can be referred to as a destination volume. In general, a destination volume is a volume that contains a set of data that is equivalent to the set of data on an original source volume.

"SnapMirror" (registered trademark of NetApp Inc.) is a is a data migration technology provided by NetApp Inc. SnapMirror is used to migrate a dataset from a source volume to a destination. The dataset is migrated entirely during a first migration operation. In subsequent transfers only new and changed data blocks are transferred.

"Volume" is a logical data set which is an abstraction of physical storage, combining one or more physical mass storage devices (e.g., disks) or parts thereof into a single logical storage object, and which is managed as a single administrative unit, such as a single file system. A volume is typically defined from a larger group of available storage, such as an aggregate.

As used in this disclosure, the terms "component" "module", "system," and the like are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick, flash memory device or any other non-volatile memory device, or any other storage device, in accordance with the claimed subject matter.

System:

FIG. 1A shows an example of a system 10 having a storage management application 18 for implementing the embodiments of the present disclosure, as described below. A clustered system, described below with respect to FIG. 1G may also be used to implement the various embodiments disclosed herein.

System 10 may include a plurality of storage systems 20, each coupled to a separate mass storage subsystem 26. A storage subsystem 26 may include multiple mass storage devices. The mass storage devices in each storage subsystem 26 may be, for example, conventional magnetic disks, optical disks such as CD-ROM or DVD based storage, magneto-optical (MO) storage, flash memory storage device or any other type of non-volatile storage devices suitable for storing data. The examples disclosed herein may reference a storage device as a "disk" but the adaptive embodiments disclosed herein are not limited to disks or any particular type of storage media/device.

Each storage subsystem 26 is managed by a corresponding storage system 20. The storage devices in each storage subsystem 26 can be organized into one or more RAID groups, in which case the corresponding storage system 20 accesses the storage subsystem 26 using an appropriate RAID protocol.

Each storage system 20 may operate as a NAS based file server, a block-based storage server such as used in a storage area network (SAN), or a combination thereof, or a node in a clustered environment described below with respect to FIG. 1G, or any other type of storage server. Note that certain storage systems from Network Appliance, Inc. (NetApp®) in Sunnyvale, Calif., are capable of providing clients with both file-level data access and block-level data access.

The storage systems 20 may be coupled through a network 14 to a number of clients 12. Each client 12 may be, for example, a conventional personal computer (PC), workstation, or the like. The network 14 may be, for example, a local area network (LAN), a wide area network (WAN), or other type of network or a combination of networks. Each storage system 20 receives and responds to various read and write requests from clients 12, directed to data stored in or to be stored in a corresponding storage subsystem 26.

Also connected to the network 14 is a management console 16, in which the storage management application 18 may reside and execute. The management console 16 may be, for example, a conventional PC, a workstation, or the like. The storage management application 18 may be used by a storage network administrator to manage a pool of storage devices (may also be referred to as a resource pool). Storage management application 18 enables a storage administrator to perform various operations, such as monitoring and allocating storage space in the storage pool, creating and deleting volumes, directories and others. The management application also allows a storage administrator to provision and configure storage space for non-disruptive migration, as described below in detail.

Communication between the storage management application 18, clients 12 and storage systems 20 may be accomplished using any of the various conventional communication protocols and/or application programming interfaces (APIs), the details of which are not germane to the technique being introduced here. This communication can be done through the network 14 or it can be via a direct link (not shown) between the management console 16 and one or more of the storage systems 20.

One or more other storage-related applications 24 may also be operatively coupled to the network 14, residing and executing in one or more other computer systems 22. Examples of such other applications include data backup software, snapshot management software and others.

Figure 1B:
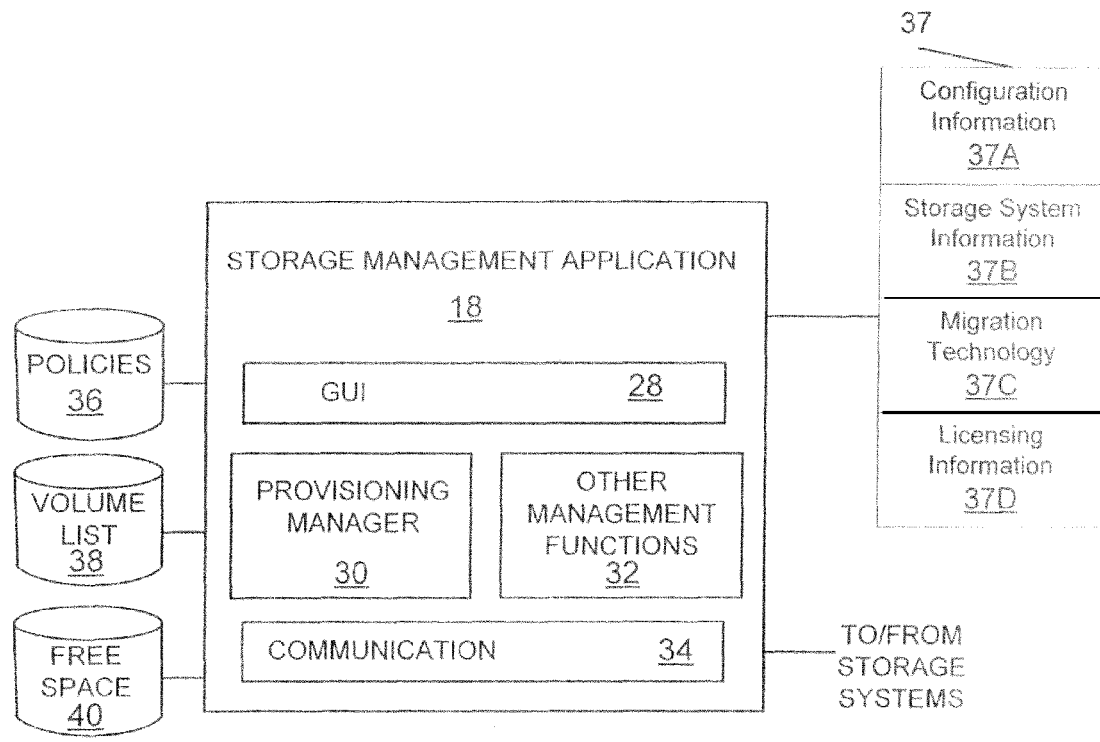
FIG. 1B shows a block diagram of a storage management application, used according to one embodiment of the present disclosure.

Storage Management Application:

The techniques being introduced here can be implemented in the storage management application 18. FIG. 1B illustrates the storage management application 18 in greater detail, according to certain embodiments that implement the process described below. In the illustrated embodiment, the storage management application 18 includes a graphical user interface (GUI) module 28 to generate a GUI (e.g., for use by a storage administrator); a provisioning manager module (may also be referred to as a provisioning manager) 30 for provisioning storage, according to one embodiment; one or more other management modules 32 to perform various other storage management related functions; and a communication module 34. In another embodiment, the storage management application 18 may provide a command line interface (CLI) for use by a storage administrator for managing and configuring storage systems. The communication module 34 implements one or more conventional communication protocols and/or APIs to enable the storage management application 18 to communicate with the storage systems 20 and clients 12.

Provisioning manager 30 typically receives a provisioning request from a client 12. The request may specify storage space requirement and an access protocol that the user will use to access the storage after it is provisioned. As described below in more detail, provisioning manager 30 scans a storage resource pool, selects a storage space that best meets the user requirements, provisions the storage space and configures the provisioned storage space for non-disruptive migration as described below.

In one embodiment, storage management application 18 generates and maintains a migration data structure 37 (may also be referred to as data structure 37) that may be used for configuring non-disruptive migration of a dataset from the provisioned storage to another destination. Data structure 37 may be a table, a relational database, a data object or any other logical component that may be used to implement the adaptive embodiments, described herein. In one embodiment, data structure 37 may include various components 37A-37D that are now described below in detail.

In one embodiment, data structure 37 may include configuration information 37A (may also be referred to as data structure 37A) for the provisioned storage. Configuration information 37A may include information regarding the access protocol that is used for accessing the provisioned storage, whether the provisioned storage is used by the storage system for primary or secondary storage and other information. In one embodiment, configuration information 37A may be a table with a plurality of fields that are populated by provisioning manager 30 in response to a provisioning request, as described below in more detail. The plurality of fields may include an identifier identifying the provisioned storage, access protocol used for accessing the storage, identifier identifying a storage system (s) that manages the provisioned storage and other fields.

If the provisioned storage is to be used for secondary storage (see FIG. 1F), then configuration information 37A may also include details regarding back-up frequency, identify technology that may be used for back-up and other information used for secondary storage.

Configuration information 37A is generated and maintained by storage management application 18. The information included in configuration information 37A may be obtained from various sources, including the storage systems, clients and storage subsystems. Storage management application 18 may collect the information as part of the provisioning process or as a part of configuring the various components of the storage systems.

Data structure 37 may also include storage system information 37B (may also be referred to as data structure 37B). The storage system in this context means one or more storage systems (or nodes for a cluster system (FIG. 1G) that manage access to the provisioned storage. Storage system information 37B may be populated by the storage management application 18.

Storage system information 37B may include information regarding the capabilities of the storage systems. For example, storage system information 37B may include information regarding whether the storage system is capable of hosting a virtual storage system, and whether the storage system is a part of a clustered system and uses a global namespace for communication.

Storage system information 37B may also include information regarding how the storage system is exposed to a user, for example, a storage administrator. For example, storage system information 37B may include information regarding whether a provisioned storage is presented via a virtual storage system. The information may also indicate whether the provisioned storage space is a part of a clustered system and may include the global namespace that is used to access the clustered system. If the user is exposed to the actual physical storage then that aspect may also be indicated by storage system information 37B.

Storage system information 37B is generated and maintained by storage management application 18. The storage management application 18 may obtain the foregoing information by polling the storage systems or may be stored when the storage system is configured and updated by storage management application 18.

Data structure 37 may also include migration technology information 37C (may also be referred to as data structure 37C). Storage management application 18 maintains information regarding "appropriate" migration technology that may be used to migrate information from a source to a destination. The appropriate migration technology provides an optimum migration methodology for performing dataset migration from a source to a destination. Migration technology information 37C may include information regarding different storage systems, including how a storage system provides information and what technologies/migration processes that may be available to migrate storage. For example, data structure 37C may include information indicating that a storage system provides information using NFS, and has access to SnapMirror, Volume Copy, Volume Move and NDMP Copy and other migration technologies for processing a migration request, as described below in detail. SnapMirror, Volume Copy and Volume Move are proprietary migration technologies provided by NetApp Inc. It is noteworthy that the examples of migration technologies are simply provided herein as an illustration for data structure 37C and any migration technology may be included in data structure 37C.

Migration technology 39C may also include information regarding backup technology/process that may be used for migrating a secondary volume, as described below.

Migration technology 37C may be generated and maintained by storage management application 18. The storage management application 18 may obtain information for migration technology 37C by polling the storage systems or may generate/update this inform when the storage system is configured by storage management application 18.

Data structure 37 may also include licensing information 37D (may also be referred to as data structure 37D) used by storage management 18 to ascertain if a user has the appropriate license to use a migration technology specified in 37C. Licensing information 37D may be used by storage management application 18 to verify if a client is allowed to use and access a particular migration technology/methodology. For example, licensing information 37D may show if a client can use SnapMirror, perform a Volume Copy operation or use any other migration related technology.

Although licensing information 37D is shown as being a sub-component of data structure 37, it may be maintained by any entity, for example, an entity that provides client access to storage system 20 and management application 18. Storage management application 18 may communicate with a central repository (or server) that stores licensing information 37D for clients in a database (not shown). Storage management application 18 may query the server to determine if a particular client has a valid license for a selected migration technology.

In one embodiment, although data structure 37 is shown to have multiple components, for example, data structures 37A-37D, each of these components may exist as separate modules or may be included in an integrated single data structure. In a distributed architecture, different components of data structure 37 may be stored in different locations and may be accessible to storage management application 18 via network 14.

Data structure 37 may be maintained by storage management application 18 at a memory location that is accessible to storage management application 18. For example, the memory location may be local to the management console 16 that executes storage management application 18 or may be remote to management console 16.

The storage management application 18 may also maintain policies 36, a list 38 of all volumes in a storage pool as well as a data structure 40 (shown as free space 40 and may also be referred to as free space 40) with information regarding all free storage space in a storage pool. Free space 40 may be a table, database or any other data structure. Free space 40 may be maintained by storage management application 18 at a memory location that is accessible to storage management application 18. For example, the memory location may be local to the management console 16 that executes storage management application 18 or may be remote to management console 16. Free space 40 may be maintained and updated by storage management application 18 by communicating with different storage systems 20 via network 14 or otherwise.

Free space 40 may include details regarding storage space that may be available for a user at any given time. The details may include type of storage, available storage space, the access protocol that may be used to access available storage and any other information that can be used to provision and configure storage.

In one embodiment, storage management application 18 may use policies 36, volume list 38, free space with access protocol information 40 and data structure 37 for configuring storage for non-disruptive migration and facilitating non-disruptive migration, as described below. The various adaptive embodiments of the present disclosure and the functionality of the storage management application are now described below with respect to the various process flow diagrams.

Figure 1C:
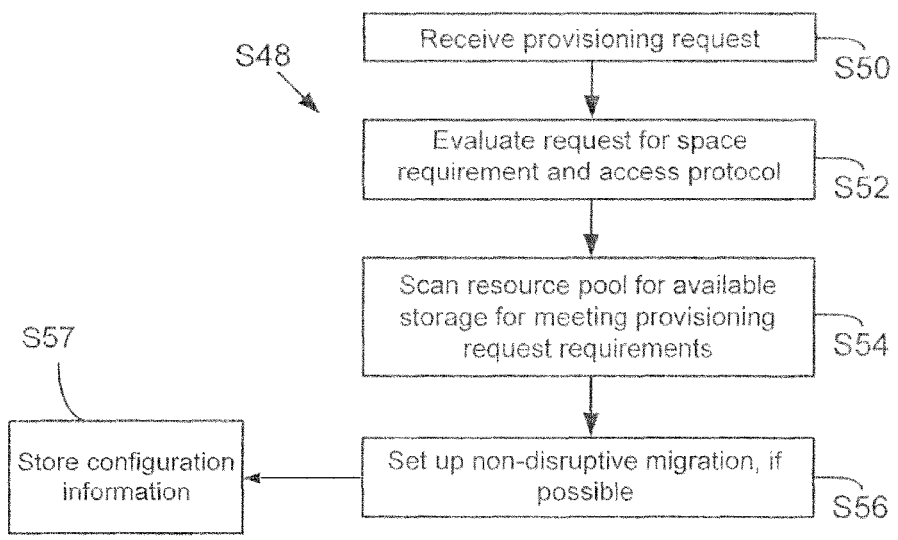
FIG. 1C shows a process flow diagram for provisioning storage, according to one embodiment.

Provisioning Storage:

FIG. 1C shows a process flow diagram S48 for provisioning storage, according to one embodiment of the present disclosure. In block S50, a provisioning request is received to provision a storage space. In one embodiment, the provisioning manager 30 receives the provisioning request from one of the clients 12. The provisioning request may indicate an amount of storage space that the user may need. The request may also indicate an access protocol that the user may use to access the provisioned storage. Currently there are various access protocols that may be used to access the provisioned storage, for example, NFS, FC, iSCSI, CIFS and others.

In block S52, the provisioning request is evaluated by the provisioning manager 30. In particular, the provisioning manager 30 extracts information relating to the amount of space requested by the user and the access protocol that will be used by the user to access the storage space after it is provisioned. The provisioning manager 30 may extract the foregoing information from the received provisioning request.

In block S54, provisioning manager 30 scans a list of available storage from a resource pool to select a storage space that can accommodate the provisioning request. In one embodiment, the resource pool may be a part of the data structure (free space) 40 (FIG. 1B), which is accessible to provisioning manager 20. As described above, free space 40 may include details regarding storage space that may be available for a user at any given time. The details may include type of storage, available storage space, the access protocol that may be used to access available storage and any other information that can be used to provision storage.

An example of a resource pool is shown within a screen shot (may also be referred to as window or segment) 400 of FIG. 4A. The screen shot 400 is provided by GUI 28 to a user. Screen shot 400 may be used by the user to perform provisioning according to the process blocks of FIG. 1C.

Window 400 includes a selectable option 402. Option 402 when selected displays the resource pool that is available to a user. A selected storage space from the resource pool is shown as 404. The associated datasets for the selected storage are show in segment 408.

Referring back to FIG. 1C, after scanning the resource pool, provisioning manager 30 selects a storage space that meets the user specified space requirement and is accessible via the user specified access protocol. In one embodiment, provisioning manager 30 uses the information extracted from the provisioning request (for example, amount of storage space, storage space type and access protocol) and compares the extracted information with information stored in free space 40. Based on a match, provisioning manager 20 selects a storage space from the available storage space.

In block S56, if possible, transparent migration (or non-disruptive migration) for the provisioned storage is setup. Provisioning manager 20 configures the provisioned storage space and sets an indicator showing if a dataset within the provisioned storage space is configured for non-disruptive migration. An example of this is shown as 409 in segment 408 of window 400 of FIG. 4A. Segment 408 shows the datasets that are associated with a selected provisioned storage space 404 and whether non-disruptive migration is possible for the dataset.

Whether non-disruptive migration can be setup depends on the storage type, user needs, the access protocol used to access the provisioned storage and storage system capabilities. This is described below in detail with respect to FIGS. 1D and 1E.

Figure 4B:
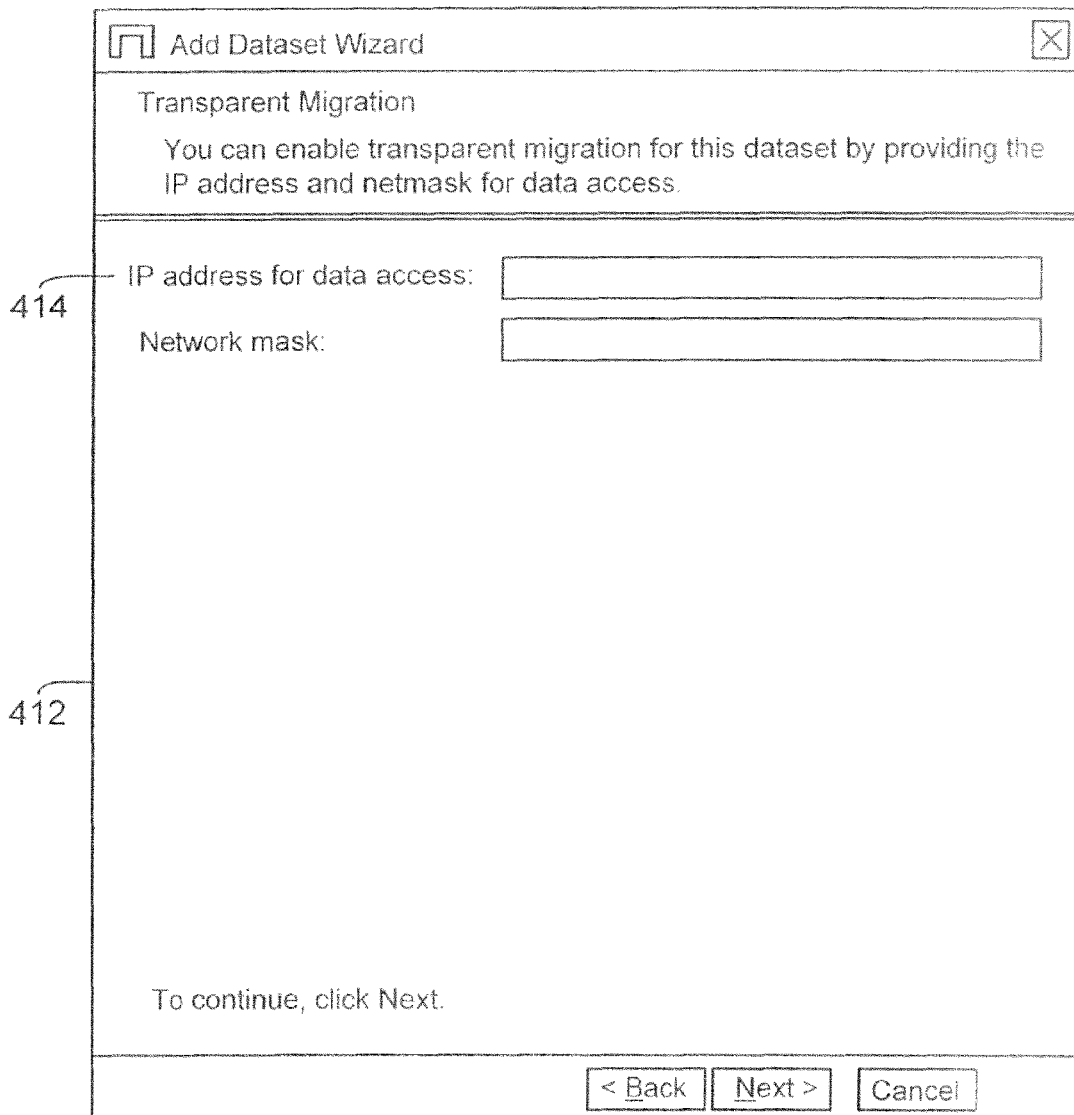
Figure 4C:
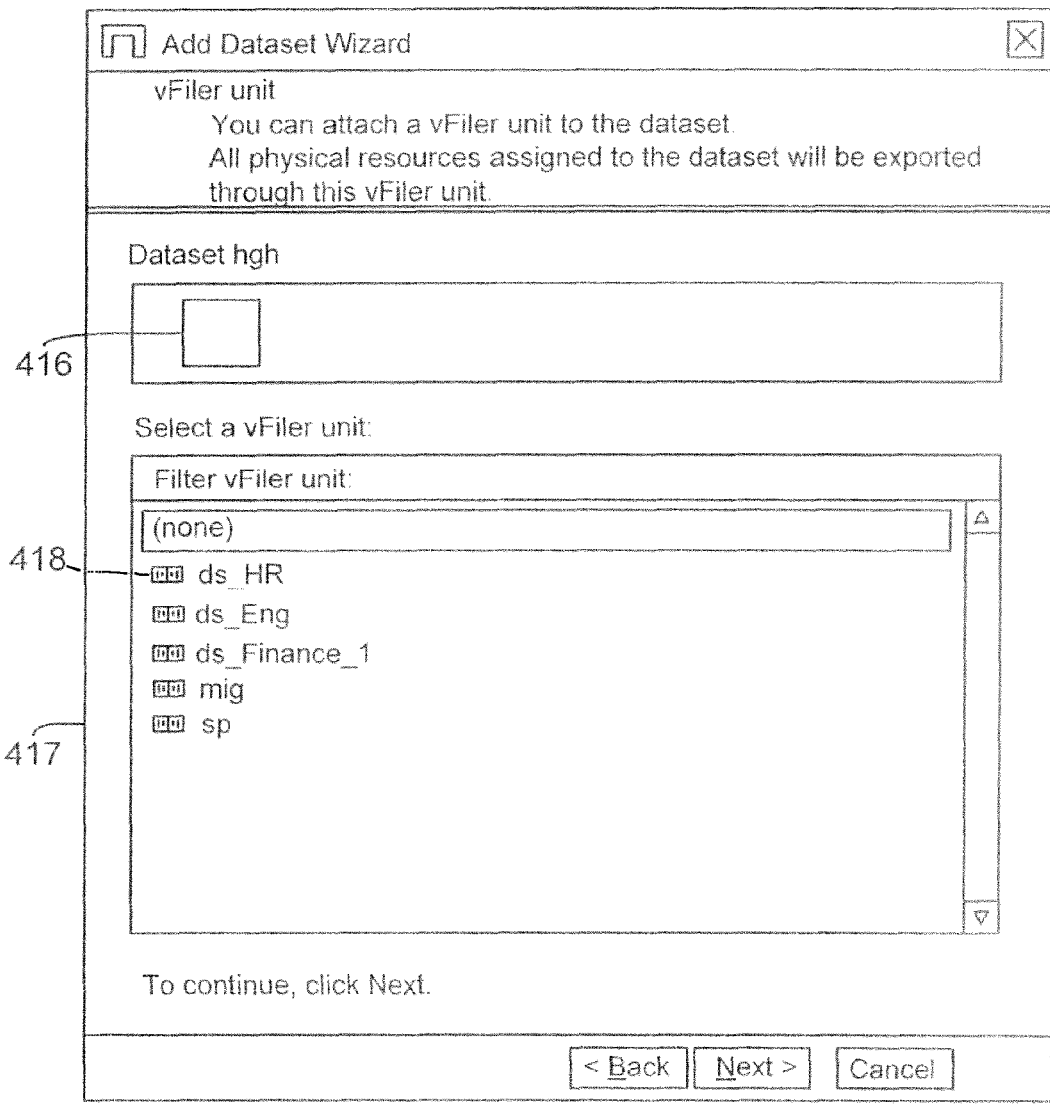

An example of setting up non-disruptive migration is shown in a wizard like setting of FIG. 4B. In this example, non-disruptive migration is set up for a data set associated with a provisioned storage space. FIG. 4B shows a screen shot 412 that may be triggered by selecting the "Add" option 410 from FIG. 4A. The user specifies the IP address in segment 414. The IP address is the address used by the user to access the dataset and the provisioned storage. If the IP address is not specified, then the user is shown screen 417 (FIG. 4C). Screen 417 allows the user to select a virtual storage system (referred to as a "vfiler unit"). The data set is shown in segment 416 and the available vfiler units for the dataset are shown in segment 418. The user may select a vfiler unit from segment 418 and non-disruptive migration is then set up by the storage management application 18.

After provisioning the storage and setting up non-disruptive migration, in block S57, management application 18 stores configuration information for the provisioned storage in the various components of data structure 37 that have been described above in detail. Once the storage space is provisioned, it can be used by a storage system to store information.

Figure 4D:
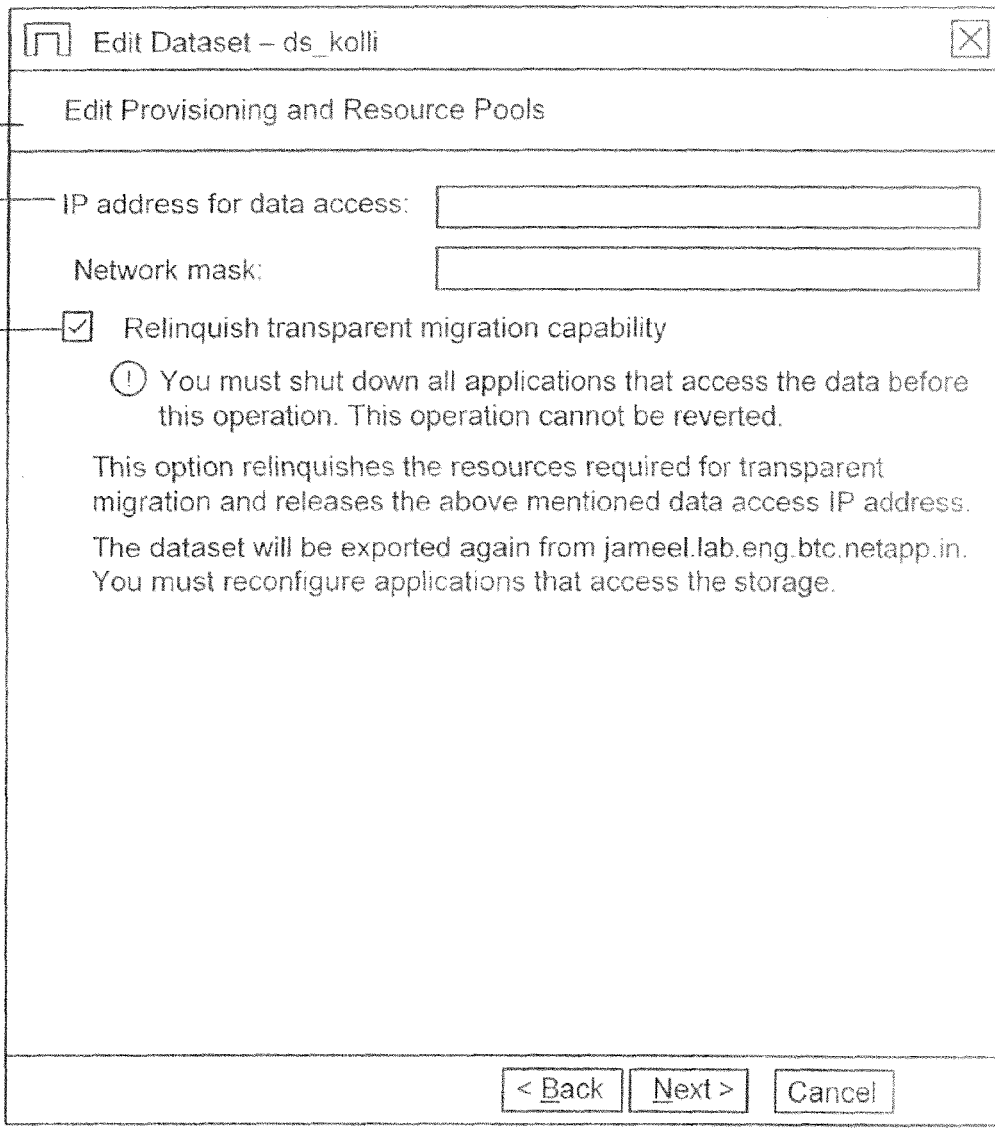

A user is allowed to edit the provisioned storage configuration information and even relinquish non-disruptive migration for a dataset. This is shown in screen shot 420 of FIG. 4D. Segment 422 shows the IP address of a selected dataset. The user selection relinquishing non-disruptive migration is shown as 424.

Figure 1D:
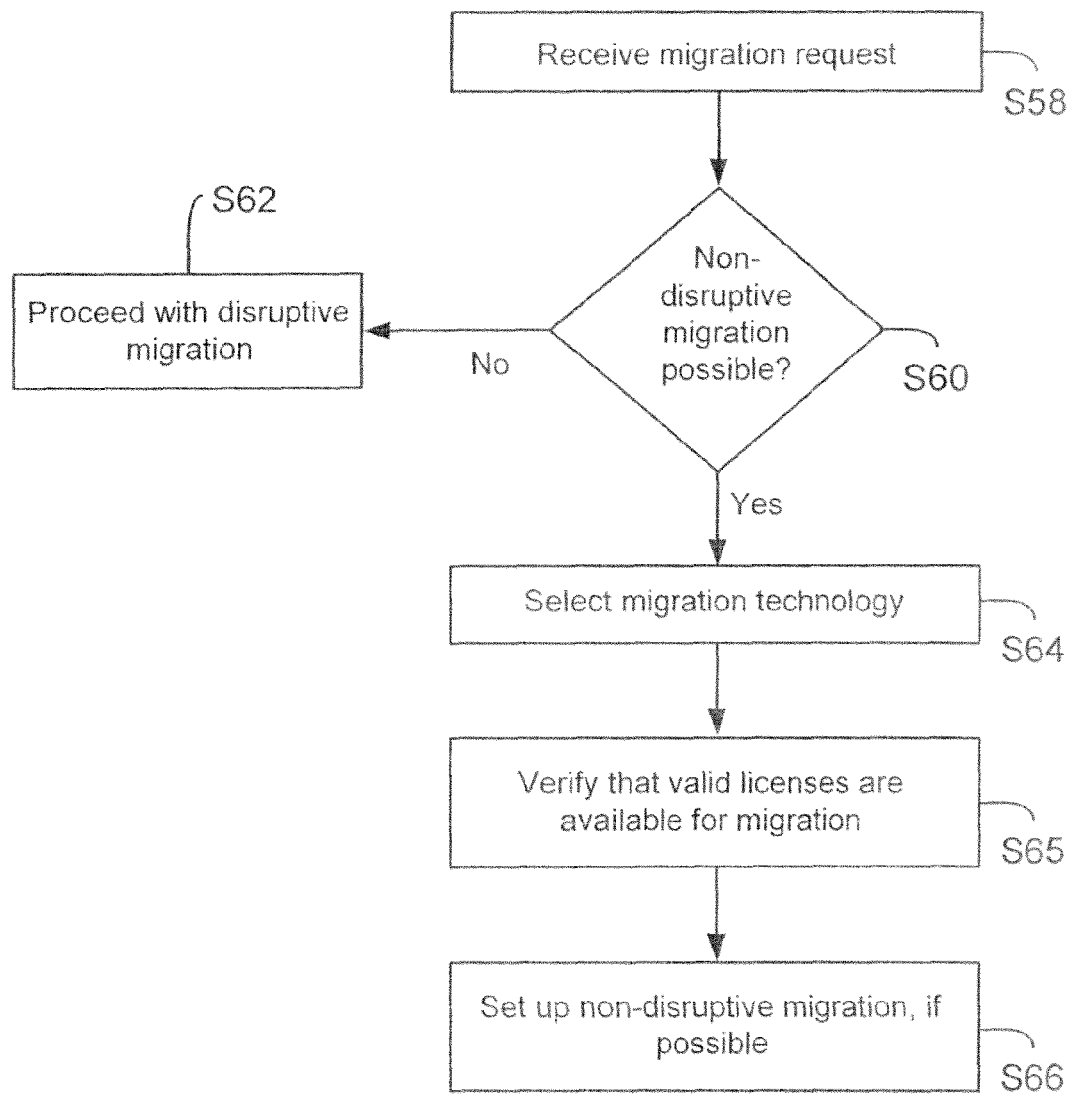
FIG. 1D shows a process flow diagram for handling a migration request, according to one embodiment.

Processing a Migration Request:

FIG. 1D shows a process flow diagram for processing a migration request that is received from a client, according to one embodiment. The process begins in block S58, when a migration request is received from a client 12 to migrate a dataset from a first storage (may also be referred to as a source storage or source volume) to a second storage (may also be referred to as destination storage or destination volume). The request may be received by management application 18 via a user interface, as described below with respect to FIGS. 5A and 6A.

In block S60, management application 18 determines if non-disruptive migration is possible. The process for determining if non-disruptive migration is possible is described below in detail with respect to FIG. 1E.

If non-disruptive migration is not possible, then the process moves to block S62, where disruptive migration is performed by migrating information from the source storage volume to a destination storage volume.

If non-disruptive migration is possible as determined in block S60 and described below with respect to FIG. 1E, then in block S64, the management application 18 selects an appropriate methodology for the migration. The appropriate migration methodology may be selected by the storage management application 18 by using the information stored in migration technology data structure 37C that has been described above in detail with respect to FIG. 1C. The following provides a few examples of some of the methodologies that may be used for non-disruptive migration and selected using migration technology data structure 37C.

If a storage system provides data to an application using NFS, then the data may be migrated using a plurality of technologies, for example, SnapMirror; Volume Copy; Virtual storage system migration process; NDMP copy operation; Volume Move operation and others. If the data is to be migrated across aggregates within a same storage system, then SnapMirror migration may result in the least or no disruption to clients. If this technology is available, then it is selected to perform the migration. This information may also be stored in data structure 37C by storage management application 18, as described above.

If a virtual storage system (vfiler) is available and data is to be migrated across the storage system, then using the virtual storage system can migrate data with minimal or no disruption. As described above, this information may also be stored in data structure 37C and is accessible to storage management application 18.

If the data resides in a clustered system described below with respect to FIG. 1G, then volumes are migrated across cluster nodes using a Volume Move operation. A global namespace is used to move the data across the cluster, as described below. As described above, this information may also be stored in data structure 37C and is accessible to storage management application 18.

If one has to migrate a secondary volume that stores archival information, then an appropriate backup technology is selected to migrate information. Examples of appropriate backup technology are NetApp NearStore VTL, NetApp FAS Storage, SnapVault and others as provided by NetApp Inc. Inc (without derogation to any trademark rights of Netapp Inc.). It is noteworthy that the adaptive embodiments are not limited to the backup technologies mentioned above because any other backup technology may be used to migrate information. As described above, this information may also be stored in data structure 37C and is accessible to storage management application 18.

In one embodiment, the management application 18 using data structure 37C, automatically selects an optimum technology based on user request and storage system capability.

Once the appropriate methodology is selected, in block S65, the management application verifies if appropriate licenses for performing the migration are available and valid. Licensing information 37D that is described above with respect to FIG. 1B, may be used to verify if valid licenses are available for the selected migration methodology.

If valid licenses are available, that in block S66, non-disruptive migration is performed. If a valid license is unavailable, then the user is prompted to obtain a valid license, or the process terminates. The user may obtain the valid licenses from an entity (for example, NetApp Inc.) that controls the licenses for the selected migration technology in block S64.

Figure 5A:
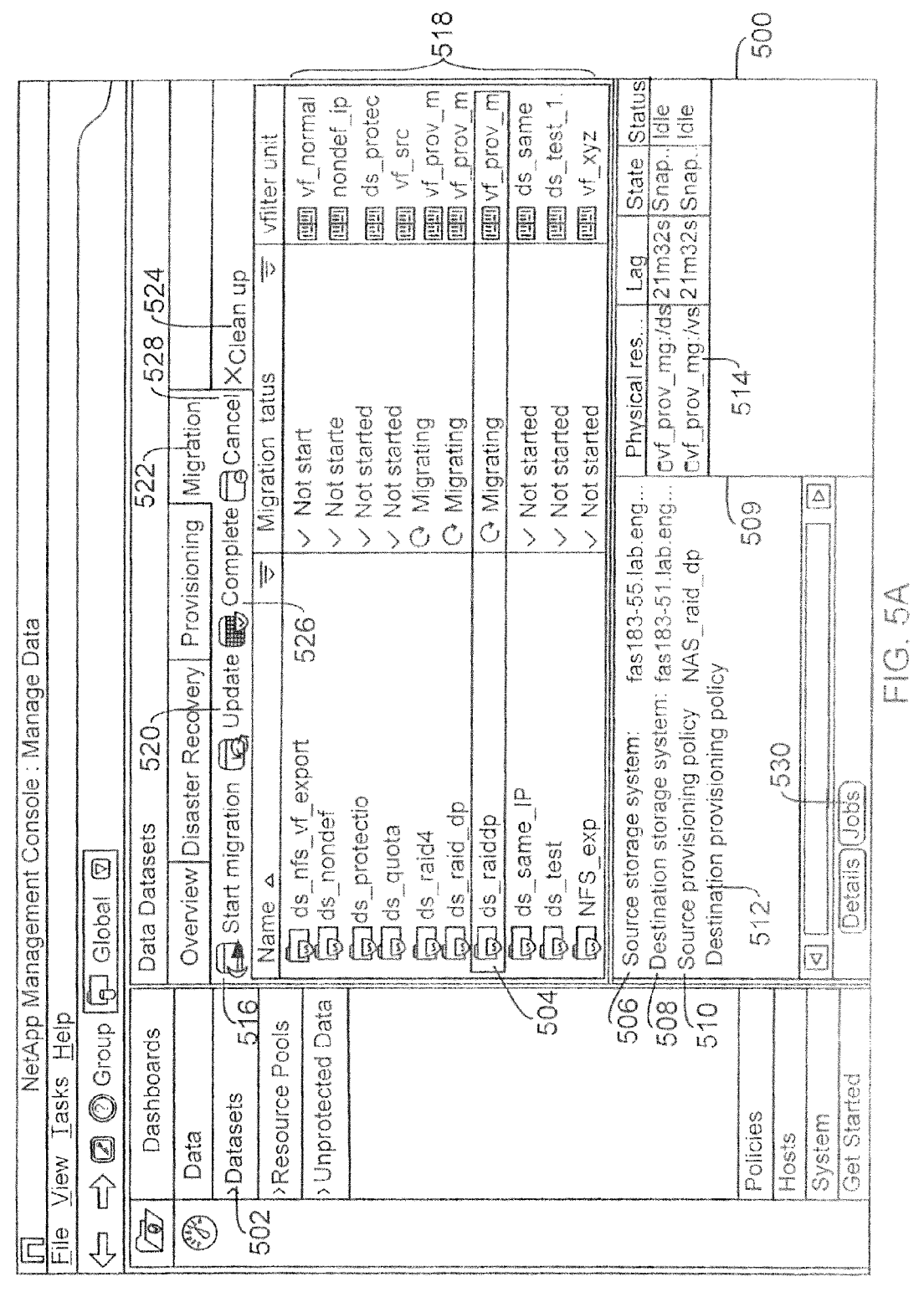
Figure 5B:
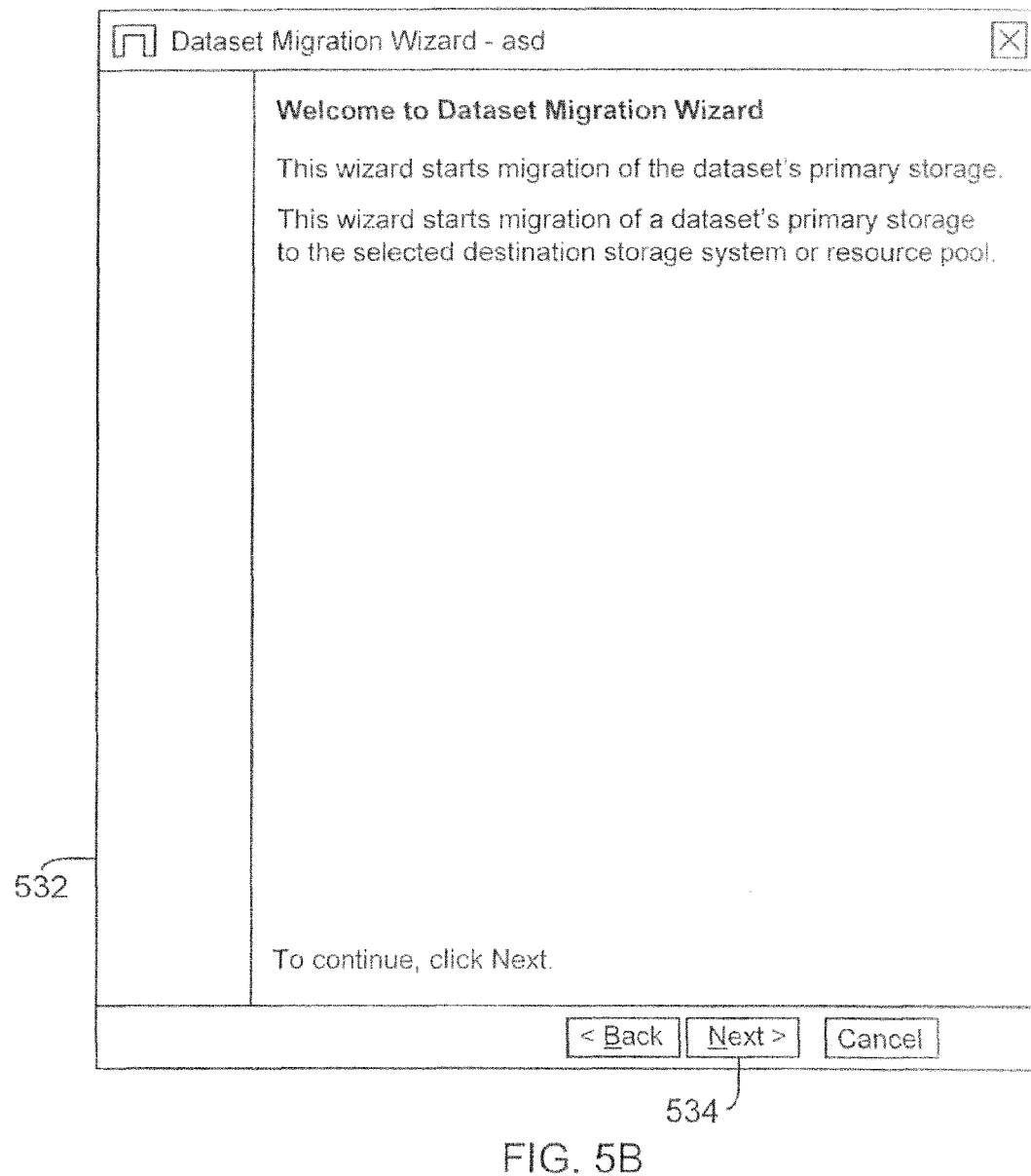

The screen shots of FIGS. 5A-5F illustrate the migration process blocks described above with respect to FIG. 1D. FIG. 5A shows a window 500 that is presented to a user by storage management application 18. Window 500 provides various options to a user, including submitting a request for migration (S58, FIG. 1D) as described below. A user is able to view various datasets by selecting the "dataset" option 502 within window 500. Based on user selection, various datasets are shown in segment 518. The user may then select a dataset from segment 518. User selection within segment 518 is shown as 504. Window 509 shows the source storage system (506), the destination storage system (508), a source provisioning policy 510 and destination provisioning policy 512, associated with the selected dataset 504. Segment 514 shows details regarding physical resources.

Window 500 provides a plurality of options that are associated with the datasets. For example, a user may first migration for a dataset by selecting 522. The user may submit a migration request by selecting tab 516 that states "start migration". Tab 520 is used to launch a window for a dataset for which migration is already in process. Tab 526 launches a confirmation window when migration is complete. Tab 524 is used for "cleanup" after migration is complete. Tab 528 is used to cancel a migration process. The user can also view all pending migration jobs by selecting tab 530. This will display all the migration jobs and their pending status.

Figure 5C:
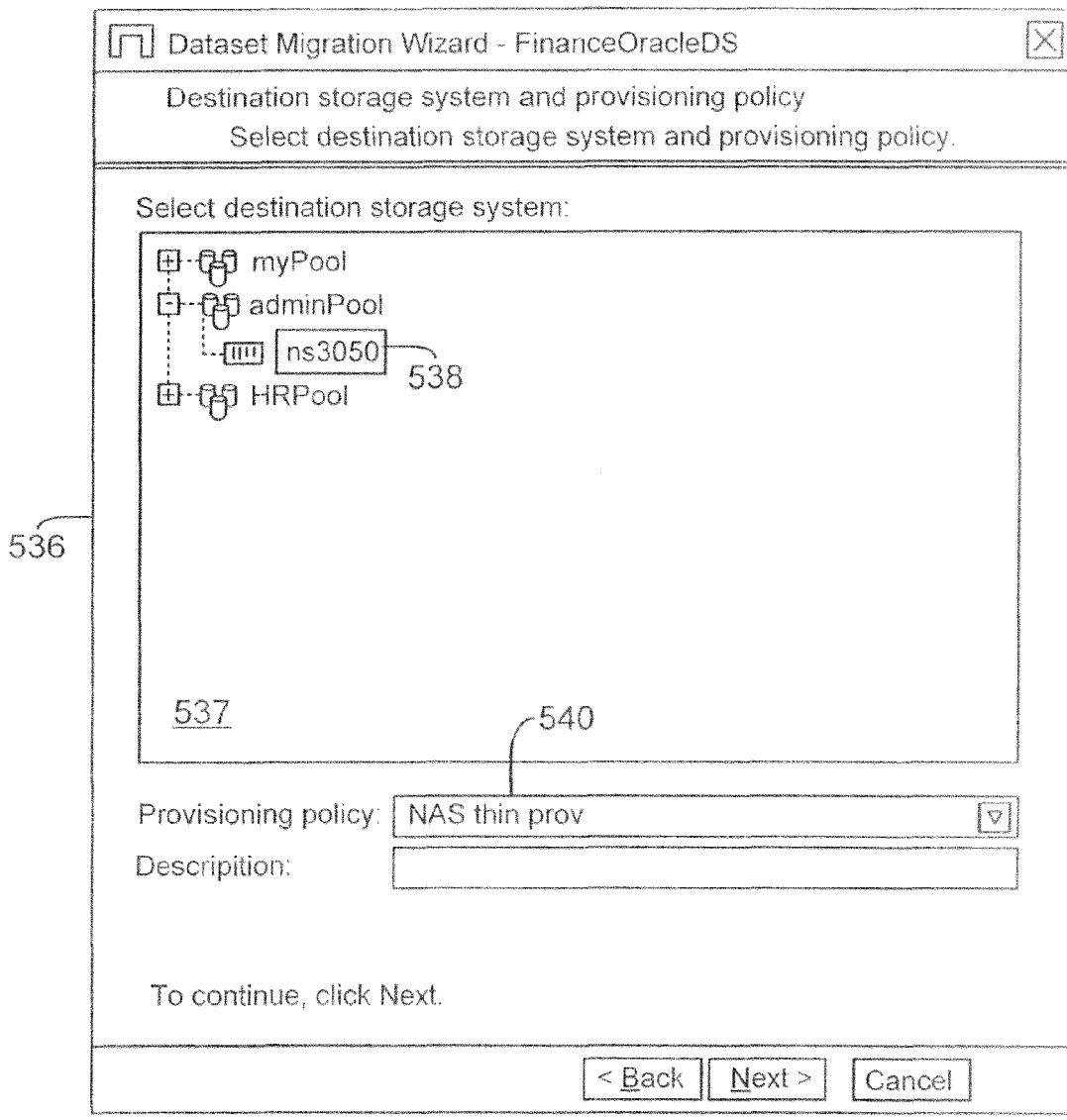
Figure 5E:
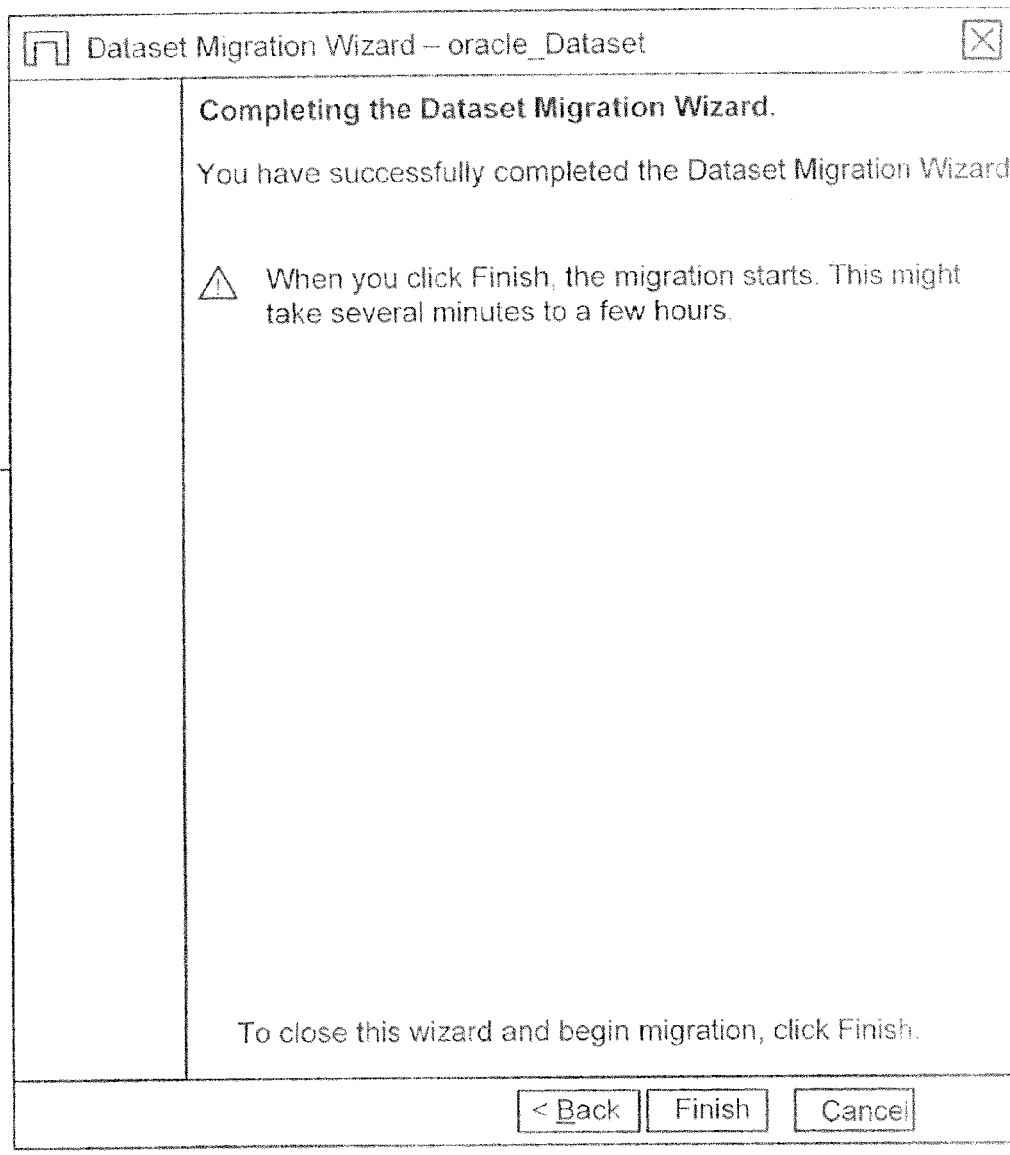
Figure 5F:
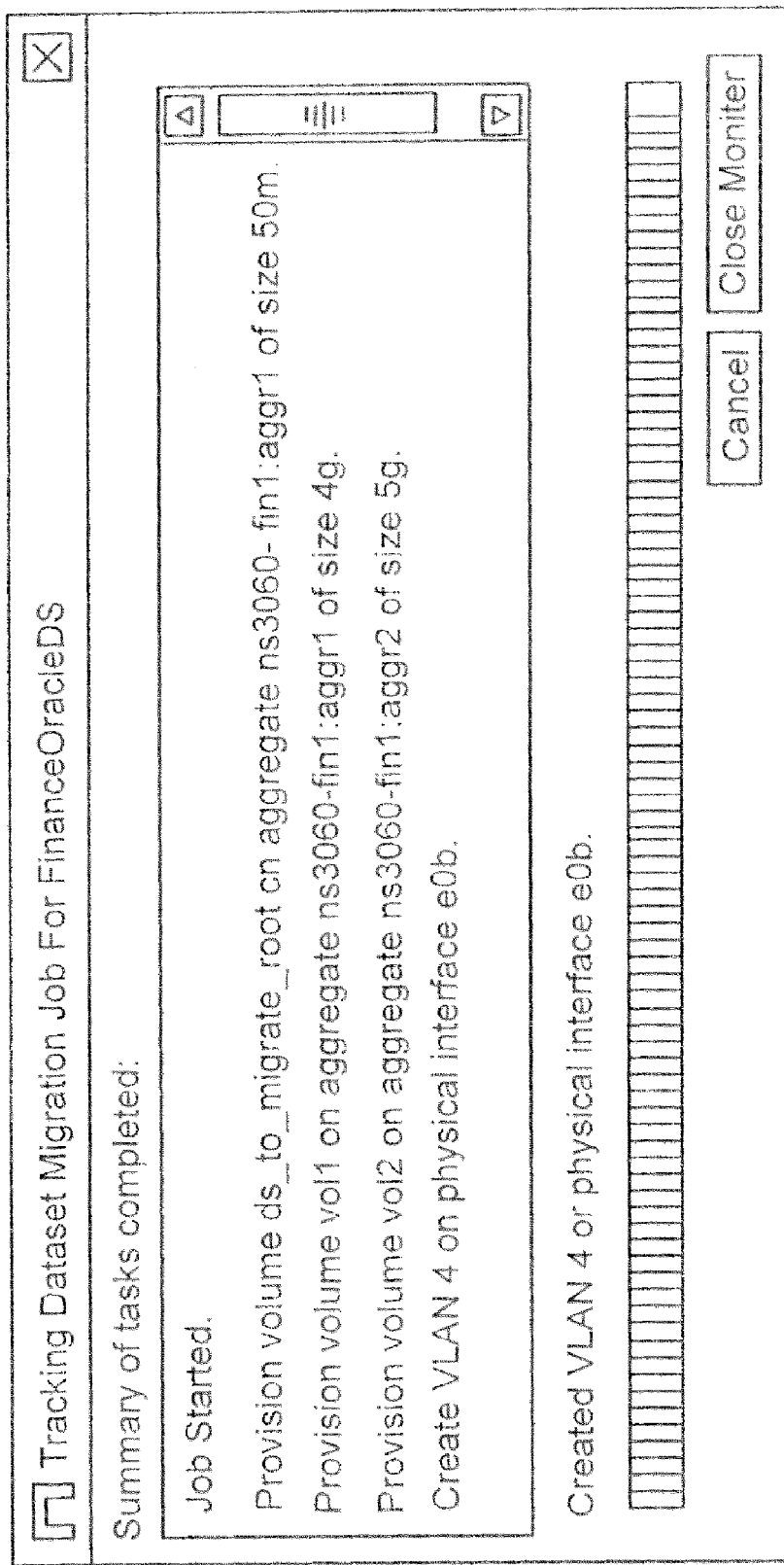
Figure 6A:
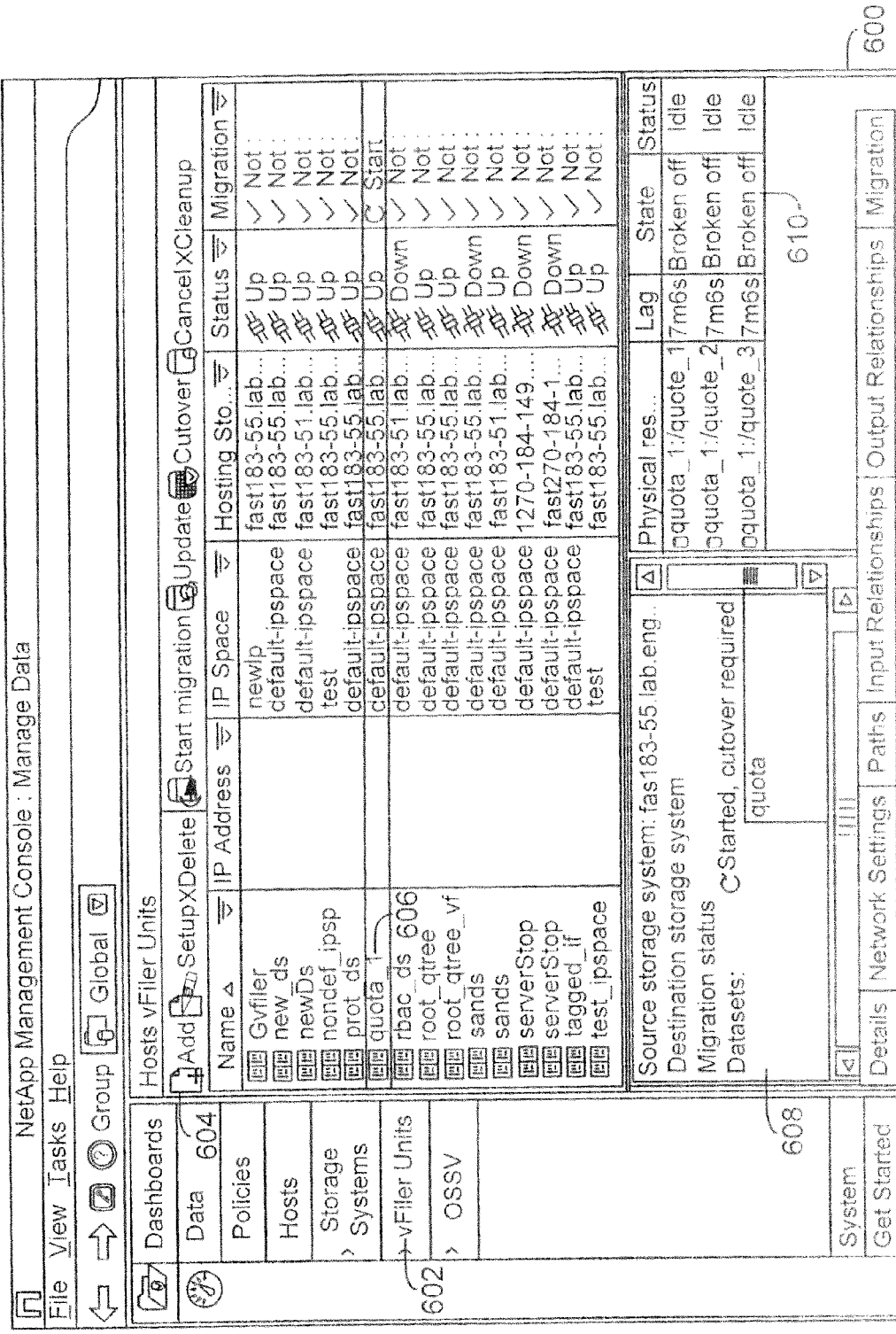

When tab 516 is selected to submit a migration request (block S58, FIG. 1D), the user is displayed the dataset Migration wizard screen 532, as shown in FIG. 5B. By selecting the Next tab 534, the user moves to the next screen 536, as shown in FIG. 5C. Screen 536 includes a window 537 from where a user can select a destination storage system (shown as 538). Segment 540 shows the provisioning policy associated with the destination storage space. FIG. 5D shows a screen 542 which allows the user to select an interface associated with an IP address 544. Thereafter, process blocks S60, S64 and S65 are executed by the storage management application 18. These blocks may not be visible to the user because they are performed automatically using data structure 37. FIG. 5E shows a completion screen 548 for the data migration (block S66, FIG. 1D). FIG. 5F shows a job tracker screen 550 from where a user can see a status on the selected migration.

FIGS. 6A-6F show screen shots that are similar to FIGS. 5A-5F, except FIGS. 6A-6F involve virtual storage systems. Screen shot 600 shows various options for virtual storage systems. The virtual storage systems (vfiler units) as shown in window 604 may be selected by using option 602. A selected virtual system is shown as 606. The source and destination systems associated with the elected vfiler unit are shown in window 608. The physical storage resources associated with the selected virtual system are shown in window 610.

Figure 6B:
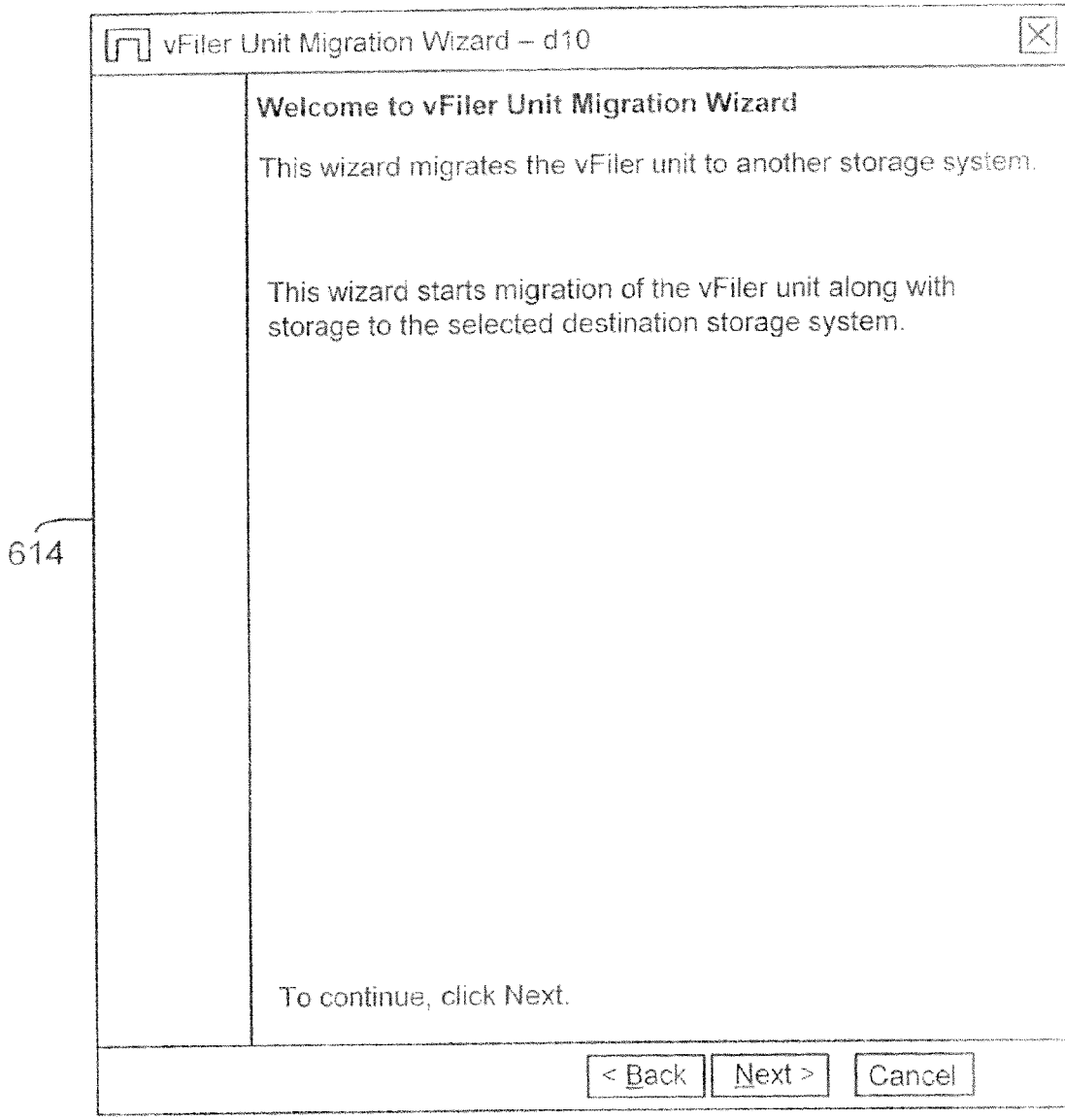
Figure 6C:
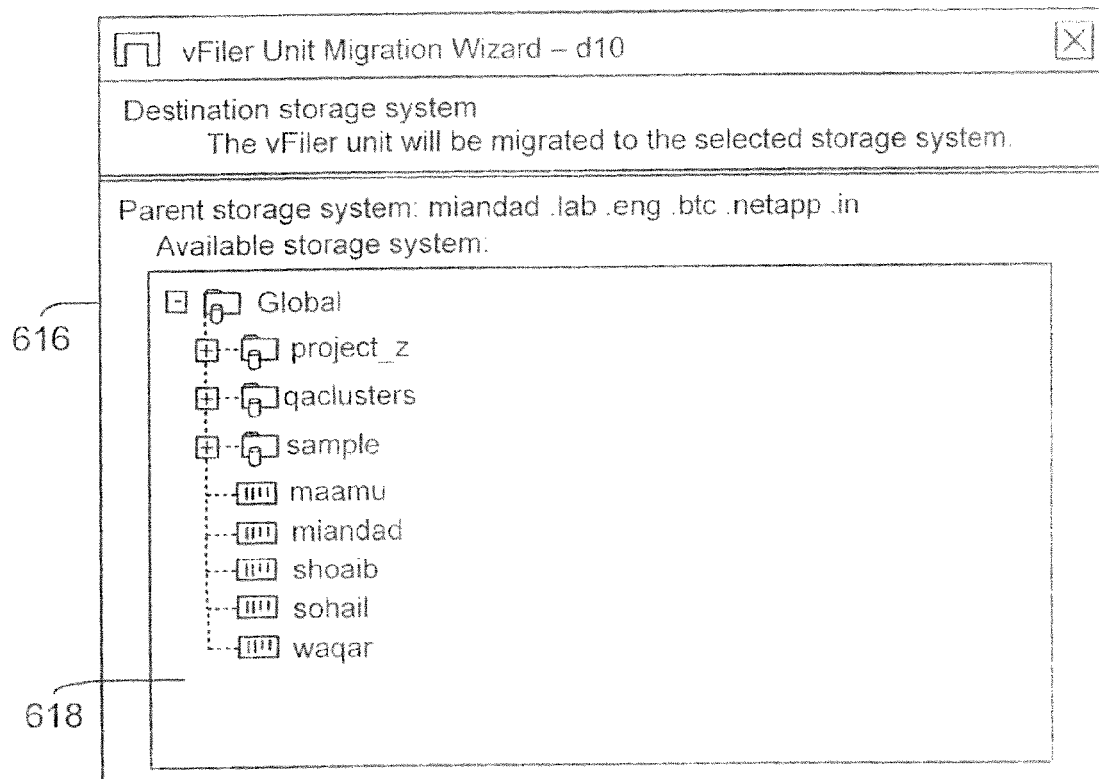
Figure 6D:
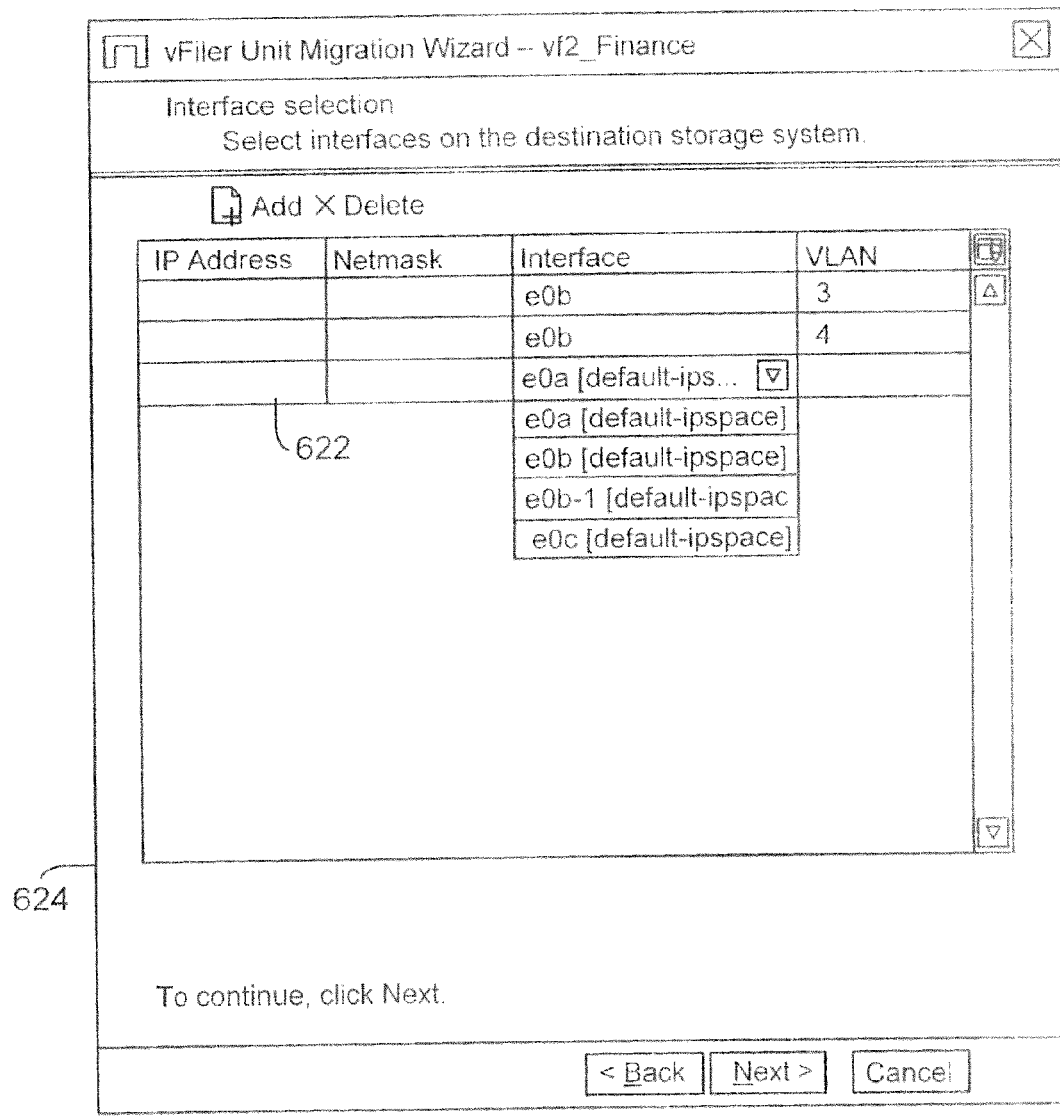
Figure 6E:
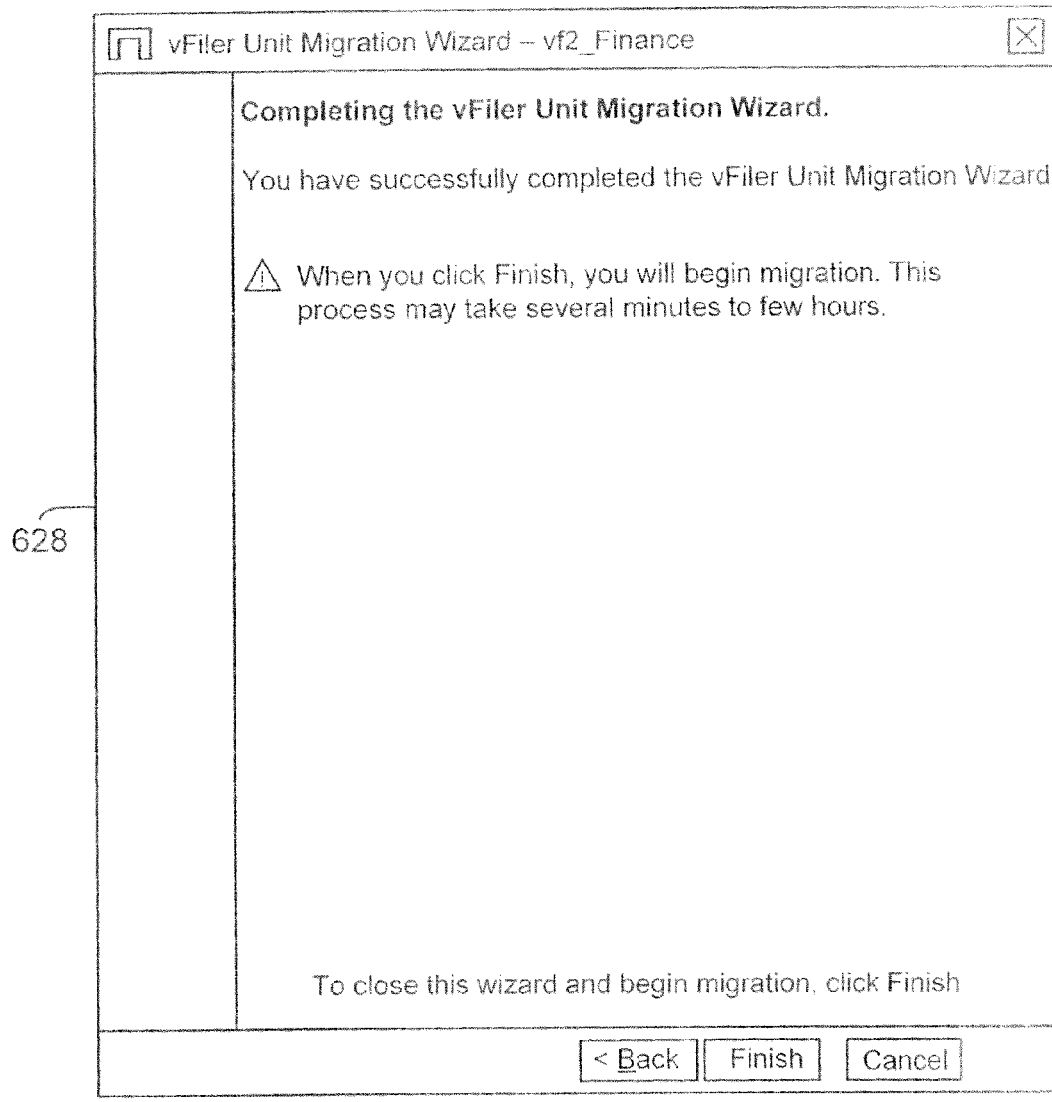
Figure 6F:
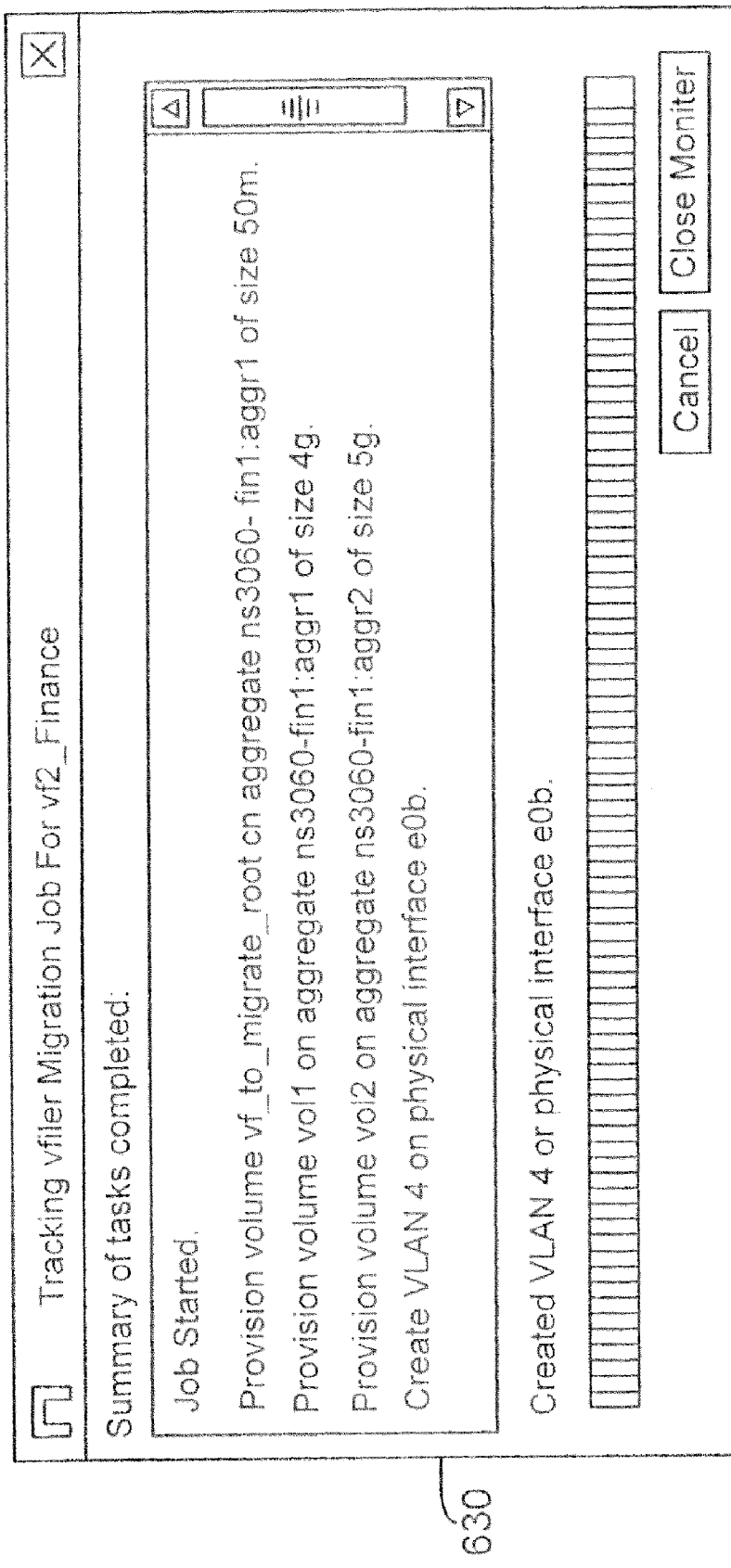

FIG. 6B shows the data migration wizard screen 614 (similar to FIG. 6B). The destination storage may be viewed in segment 618 of screen 616, shown in FIG. 6C (Similar to FIG. 5C). FIG. 6 shows an interface selection window 624 for IP address 622 (similar to FIG. 5D). FIG. 6E shows a completion window 628 (similar to FIG. 5E). The migration status may be tracked in window 630, shown in FIG. 6F (similar to FIG. 6F).

Figure 1E:
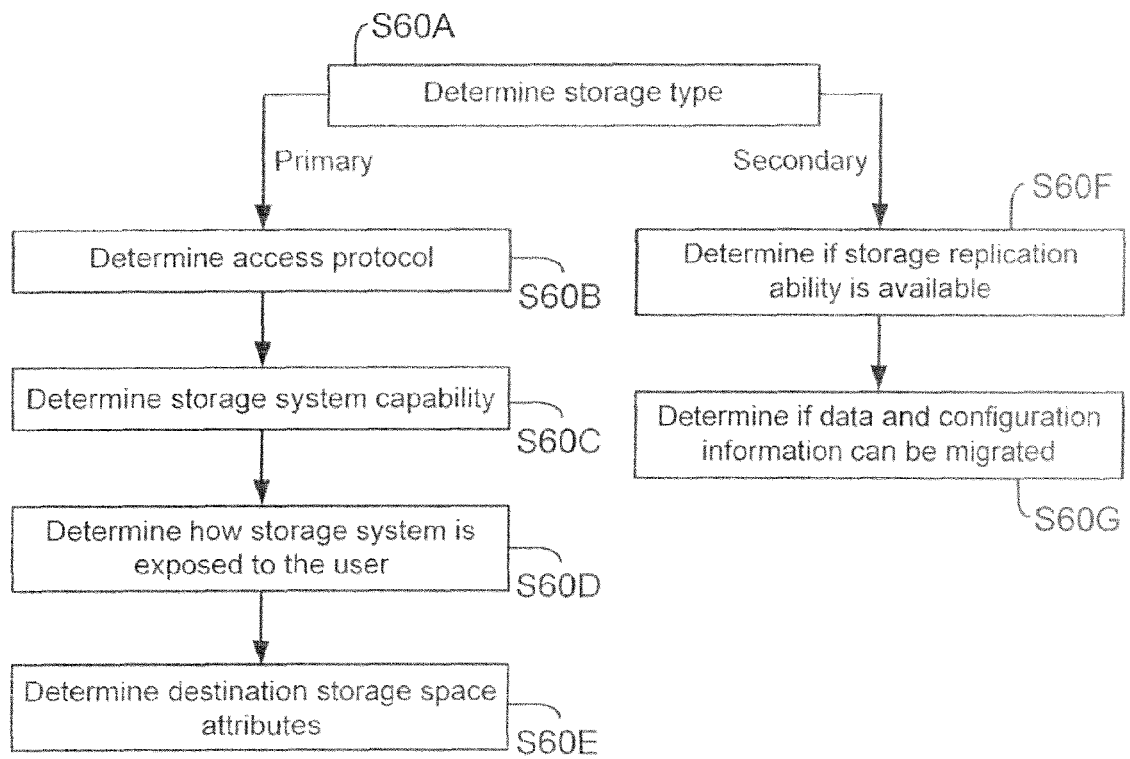
FIG. 1E shows a process flow diagram for determining whether non-disruptive migration is possible for a provisioned storage space.

FIG. 1E shows a process flow diagram for block S60, where the process determines if non-disruptive migration is possible for migrating a dataset. Block S60 may be used by storage management application 18 to configure provisioned storage for non-disruptive migration as well as for servicing a migration request from a client.

Block S60 may include first determining capabilities of the storage system that manages the first storage. This is to ascertain whether the storage system can support non-disruptive migration. The second aspect of block S60 is to determine if non-disruptive migration is possible, for example, determining how storage may be exposed to a user. The second aspect assumes that the storage system even though may be capable of performing non-disruptive migration, the non-disruptive migration may still not be possible. For example, as described below, if a user is exposed to physical storage, then non-disruptive migration may not be possible even though the storage system may be capable of performing non-disruptive migration. Various factors are considered in making this determination as described below.

The process for determining if non-disruptive migration is possible starts in block S60A, when storage management application 18 evaluates the migration request to determine if migration is for a primary storage or a secondary storage. Storage management application 18 may make this determination by checking configuration information 37A (FIG. 1B) or by polling the storage system that manages the storage involved with the migration request. As described above, data structure 37A stores information indicating whether the provisioned storage space is used for primary storage or secondary storage. Storage management application 18 may also obtain this information directly from the storage system managing the provisioned storage.

Figure 1F:
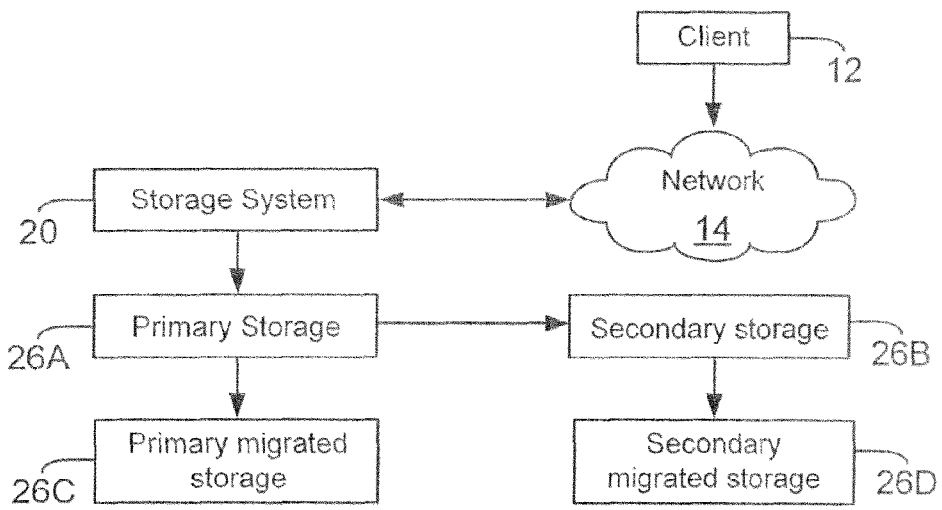
FIG. 1F shows a block diagram having primary and secondary storage, used according to one embodiment.

FIG. 1F shows an example of a primary storage 26A and secondary storage 26B. Client 12 uses storage system 20 to store information in primary storage 26A. The primary storage 26A may then be backed up at secondary storage 26B. When information stored in primary storage 26A is migrated to storage 26C, it is referred to as primary storage migration. When secondary storage 26B information is migrated to storage 26D, it is referred to as secondary storage migration.

If the migration is for primary storage, then in block S60B, the management application 18 determines the access protocol used to access provisioned storage 26C. Various access protocols may be used by the client to access the migrated storage, for example, FC, iSCSI, CIFS, NFS, NDMP and others. In one embodiment, storage management application 18 determines the access protocol information from data structure 37A a described above.

In block S60C, the management application 18 determines storage system capabilities. For example, the management application determines if the storage system is capable of hosting a virtual storage system; and whether the storage system is a part of a clustered system and uses a global namespace for communication. Storage management application 18 can ascertain this information from data structure (storage system information) 37B, described above in detail.

In block S60D, the storage management application 18 determines how the migrated storage system is exposed to the clients. Storage management application 18 makes this determination by accessing data structure 37B. For example, the storage management application 18 determines if provisioned storage is presented over a virtual storage system. If the virtual storage system is used, than the entire virtual storage system can be migrated to another location, without any disruption.

If the storage is a part of a clustered system, then a global namespace is used to access the clustered system. This allows non-disruptive migration from one location to another location within the clustered system. If there is no virtual layer and the user is exposed to the physical storage, then non-disruptive migration may not be possible. The storage management application considers these different factors to determine if non-disruptive migration is possible.

In block S60E, the storage management application 18 determines the attributes of the destination, where the information is migrated to. Storage management application 18 may obtain this information from the storage system that manages the destination storage.

The various blocks S60B, S60C, S60D and S60E may occur simultaneously. Based on these blocks, the storage management application determines if non-disruptive migration is possible.

If in block S60A, the storage to be migrated is secondary, then the process moves to block S60F when the storage management application 18 determines if storage replication ability is available. Storage management application 18 makes this determination by accessing data structure 37A that stores configuration information regarding the provisioned storage.

In block S60G, the process determines if data and configuration information with the scheduling information can be migrated. Typically, a user sets up a schedule to backup secondary storage information. Scheduling information in this context pertains to the backup schedule. Storage management application 18 may obtain this information from data structure 37A, described above in detail.

In one embodiment, storage management application 18 (for example, provisioning manager 30) configures storage space and makes the determination for non-disruptive migration during the provisioning process described above with respect to FIG. 1C. This allows a user to view datasets with an indication whether the datasets can be migrated using non-disruptive migration. This allows a user to setup and perform disruptive and non-disruptive migration based on user needs. For example, when various applications are using a dataset for which non-disruptive migration is not possible, then the user may choose to migrate a dataset for which non-disruptive migration is possible. The user may choose to migrate the data set with disruptive migration when applications are not using the dataset.

In one embodiment, the storage management application 18 receives a migration request from a client to migrate information from a first storage to a second storage is processed. The storage management application 18 determines an access protocol used by the client to access the first storage; and in response to the migration request, automatically determines if a storage system that manages the first storage is capable of supporting non-disruptive migration. If the storage system is capable of supporting non-disruptive migration, then the storage management application 18 determines if non-disruptive migration is possible. If non-disruptive migration is possible, then the storage management application 18 automatically selects a migration technique for migrating the information from the first storage to the second storage.

Clustered System:

As described above, storage management application 18 may interface with storage systems 20 and client systems 12 for performing the various process blocks of FIGS. 1C-1E.

The storage systems may be a part of a clustered system that is now described below in detail with respect to FIGS. 1G and 2.

FIG. 1G is a schematic block diagram of a plurality of nodes 102 interconnected as a cluster 100 and configured to provide storage services related to organization of information on storage devices. Storage management application 18 communicates with the plurality of nodes 102 for generating and maintaining the data structures described above with respect to FIG. 1B. A global namespace is used to uniquely identify the cluster system 100. The global namespace information may be a part of data structure 37 and may be used for migrating information from one storage volume to another storage volume within the cluster.

Nodes 102 comprise various functional components that cooperate to provide distributed storage system architecture of cluster 100. Each node 102 is generally organized as a network element (N-module 104) and a disk element (D-module 106). N-module 104 includes functionality that enables node 102 to connect to clients 114 over a computer network 112 and to storage management application 18, while each D-module 106 connects to one or more storage devices 108 (may generically be referred to as disks 108) or storage array 110 (similar to storage subsystem 26, FIG. 1A and may be also referred to as disk array 110). In one embodiment, information regarding the storage devices may be collected by the D-Module and then communicated to the storage management application 18 by the N-module.

Nodes 102 may be interconnected by a cluster switching fabric 116 which, in the illustrative embodiment, may be embodied as a Gigabit Ethernet switch. It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 102 comprising one N-module and one D-module should be taken as illustrative only.

Clients 114 (similar to clients 12, FIG. 1A) may be general purpose computers having a plurality of components. These components may include a central processing unit (CPU), main memory, I/O devices, and storage devices (for example, flash memory, hard drives and others). The main memory may be coupled to the CPU via a system bus or a local memory bus. The main memory may be used to provide the CPU access to data and/or program information that is stored in main memory at execution time. Typically, the main memory is composed of random access memory (RAM) circuits. A computer system with the CPU and main memory is often referred to as a host system.

Clients 114 may request management services from storage management application 18. In one embodiment, clients 114 may request storage provisioning (see FIG. 1C) and migration described above with respect to FIG. 1D.

Clients 114 may be configured to interact with the node 102 in accordance with a client/server model of information delivery. That is, each client 114 may request the services of the node 102, and the node 102 may return the results of the services requested by the client 114, by exchanging packets over the network 112. The client 114 may issue packets using application 115 including file-based access protocols, such as the CIFS protocol or the NFS protocol, over TCP/IP when accessing information in the form of certain data containers, such as files and directories. Alternatively, the client 114 may issue packets using application 115 including block-based access protocols, such as the Small Computer Systems Interface ("SCSI") protocol encapsulated over TCP (iSCSI) and SCSI encapsulated over FCP when accessing information in the form of other data containers, such as blocks.

Figure 2:
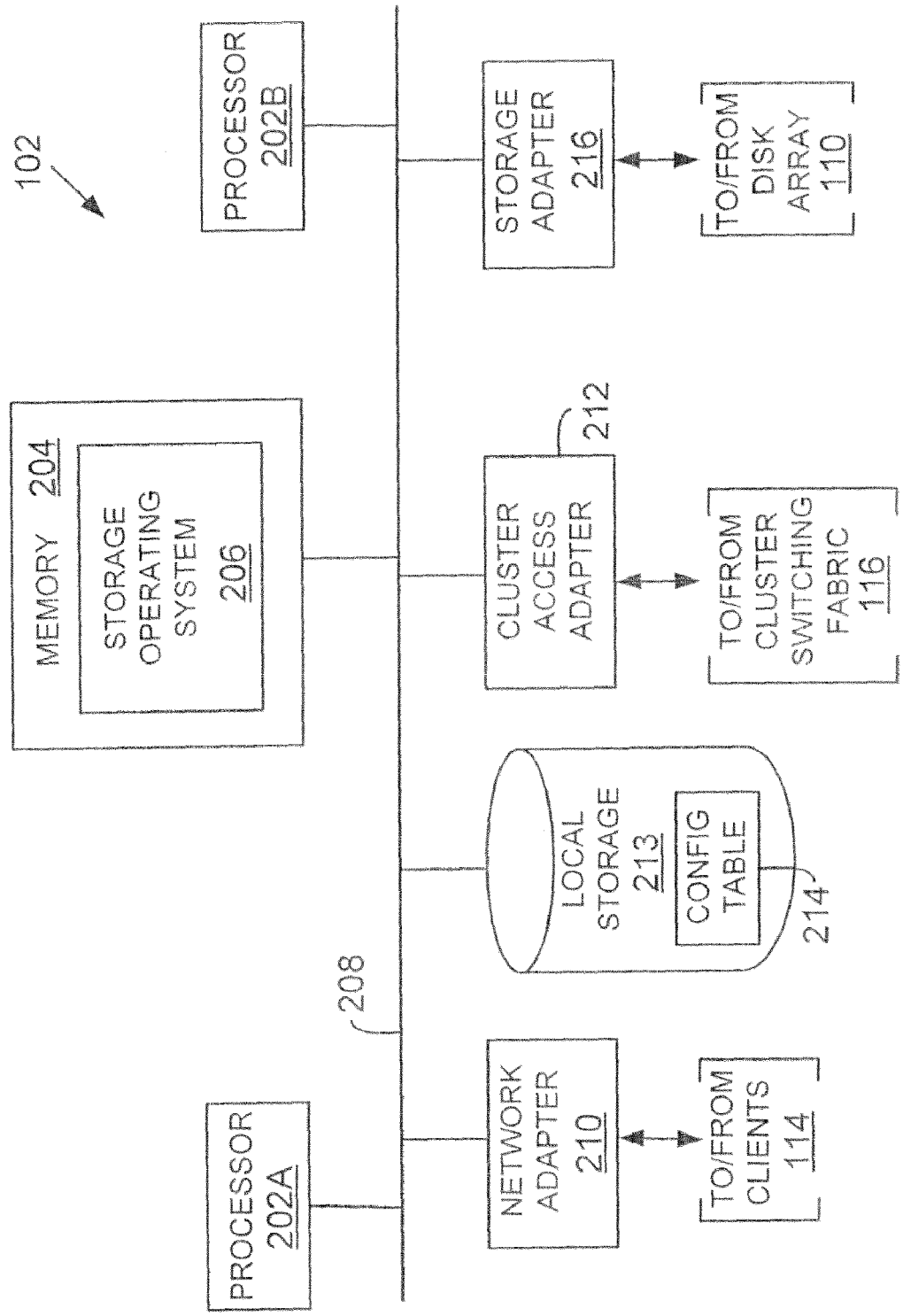
FIG. 2 shows a block diagram of a node, used according to one embodiment.

Storage System Node:

FIG. 2 is a block diagram of a node 102 that is illustratively embodied as a storage system and interfaces with storage management application 18 for generating and maintaining the data structures 37 and 40, described above with respect to FIG. 1B. Node 102 may include a plurality of processors 202A and 202B, a memory 204, a network adapter 210, a cluster access adapter 212, a storage adapter 216 and local storage 213 interconnected by a system bus 208. The local storage 213 comprises one or more storage devices, such as disks, utilized by the node to locally store configuration information (e.g., in a configuration table 214).

The cluster access adapter 212 comprises a plurality of ports adapted to couple node 102 to other nodes of cluster 100. In the illustrative embodiment, Ethernet may be used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 212 is utilized by the N/D-module for communicating with other N/D-modules in the cluster 100.

Each node 102 is illustratively embodied as a dual processor storage system executing a storage operating system 206 that preferably implements a high-level module, such as a file system, to logically organize the information as a hierarchical structure of named directories, files and special types of files called virtual disks (hereinafter generally "blocks") on storage disks 108. However, it will be apparent to those of ordinary skill in the art that the node 102 may alternatively comprise a single or more than two processor systems. Illustratively, one processor 202A executes the functions of the N-module 104 on the node, while the other processor 202B executes the functions of the D-module 106.

The memory 204 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the invention described herein.

The storage operating system 206, portions of which is typically resident in memory and executed by the processing elements, functionally organizes the node 102 by, inter alia, invoking storage operations in support of the storage service implemented by the node. An example of operating system 206 is the DATA ONTAP® (Registered trademark of NetApp, Inc. operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

The network adapter 210 comprises a plurality of ports adapted to couple the node 102 to one or more clients 114 over point-to-point links, wide area networks, virtual private networks implemented over a public network (Internet) or a shared local area network. The network adapter 210 thus may comprise the mechanical, electrical and signaling circuitry needed to connect the node to the network. Illustratively, the computer network 112 may be embodied as an Ethernet network or a FC network. Each client 114 may communicate with the node over network 112 by exchanging discrete frames or packets of data according to pre-defined protocols, such as TCP/IP.

The storage adapter 216 cooperates with the storage operating system 206 executing on the node 102 to access information requested by the clients and management application 18. The information may be stored on any type of attached array of writable storage device media such as video tape, optical, DVD, magnetic tape, bubble memory, electronic random access memory, flash memory devices, micro-electro mechanical and any other similar media adapted to store information, including data and parity information. However, as illustratively described herein, the information is preferably stored on the disks 108 of array 110. The storage adapter 216 comprises a plurality of ports having input/output (I/O) interface circuitry that couples to the disks over an I/O interconnect arrangement, such as a conventional high-performance, FC link topology.

Storage of information on each array 110 is preferably implemented as one or more storage "volumes" that comprise a collection of physical storage disks 108 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

Figure 3A:
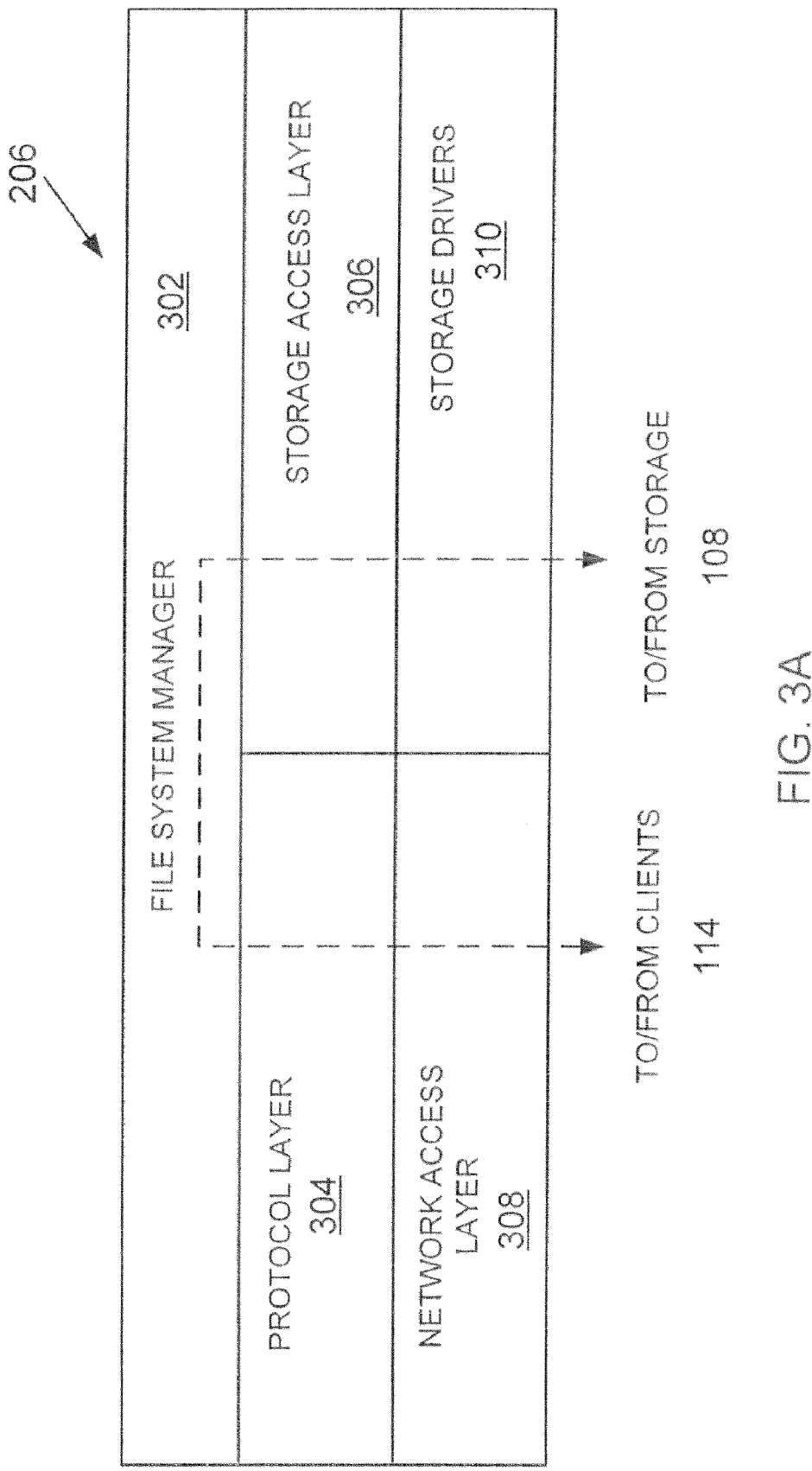
FIGS. 3A and 3B show examples of an operating system used according to one embodiment.

Operating System:

FIG. 3A illustrates a generic example of operating system 206 executed by node 102, according to one embodiment of the present disclosure. Operating system 206 may be used to provide information regarding node 102/storage system 20 to storage management application 18 and perform the actual non-disruptive migration described above. The information, as described above, may be used to generate and maintain data structure 37 and other data structures used for provisioning storage and configuring non-disruptive migration, according to the present disclosure.

In one example, operating system 206 may include several modules, or "layers" executed by one or both of N-Module 104 and D-Module 106. These layers include a file system manager 302 that keeps track of a directory structure (hierarchy) of the data stored in storage devices and manages read/write operations, i.e. executes read/write operations on disks in response to client 114 requests.

Operating system 206 may also include a protocol layer 304 and an associated network access layer 308, to allow node 102 to communicate over a network with other systems, such as clients 114 and storage management application 18. Protocol layer 304 may implement one or more of various higher-level network protocols, such as NFS, CIFS, Hypertext Transfer Protocol (HTTP), TCP/IP and others, as described below.

Network access layer 308 may include one or more drivers, which implement one or more lower-level protocols to communicate over the network, such as Ethernet. Interactions between clients 114 and mass storage devices 108 are illustrated schematically as a path, which illustrates the flow of data through operating system 206.

The operating system 206 may also include a storage access layer 306 and an associated storage driver layer 310 to allow D-module 106 to communicate with a storage device. The storage access layer 306 may implement a higher-level disk storage protocol, such as RAID (redundant array of inexpensive disks), while the storage driver layer 310 may implement a lower-level storage device access protocol, such as FC or SCSI. In one embodiment, the storage access layer 306 may implement the RAID protocol, such as RAID-4 or RAID-DP™ (RAID double parity for data protection provided by NetApp Inc. the assignee of the present disclosure).

Figure 3B:
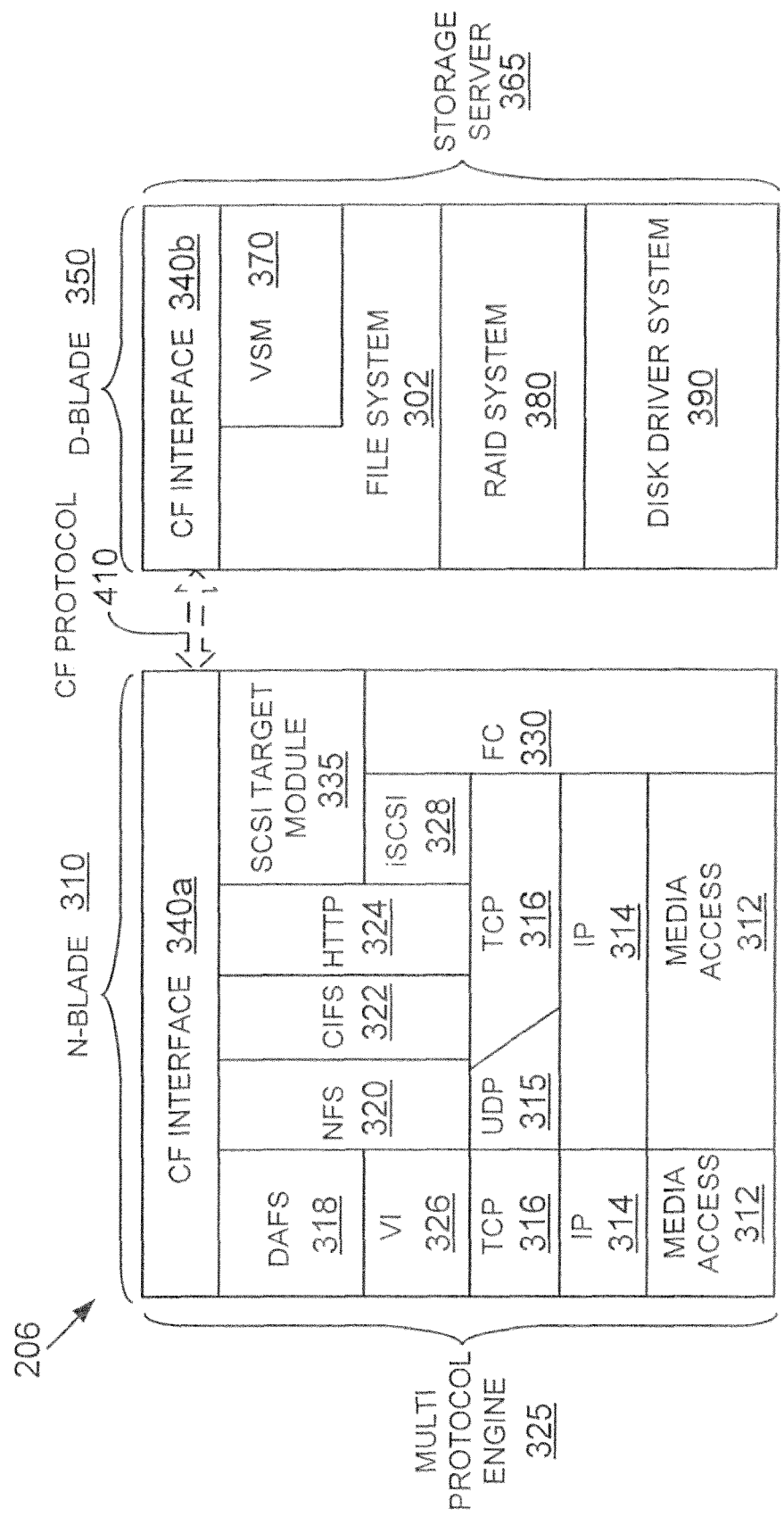

FIG. 3B shows a detailed block diagram of the storage operating system 206 that may be advantageously used with the present invention. The storage operating system comprises a series of processor executable layers organized to form an integrated network protocol stack or, more generally, a multi-protocol engine 325 that provides data paths for clients to access information stored on the node using block and file access protocols. In addition, the storage operating system includes a series of processor executable layers organized to form a storage server 365 that provides data paths for accessing information stored on the disks 108 of the node 102. Both the multi-protocol engine 325 and storage server 365 interface with the storage management application 18 to provide information for the various data structures that are used for provisioning storage and performing migration, according the embodiments disclosed herein.

The multi-protocol engine includes a media access layer 312 (part of layer 308, FIG. 3A) of network drivers (e.g., Gigabit Ethernet drivers) that interfaces to network protocol layers (part of layer 304, FIG. 3A), such as the IP layer 314 and its supporting transport mechanisms, the TCP layer 316 and the User Datagram Protocol (UDP) layer 315.

A file system protocol layer provides multi-protocol file access and, to that end, includes support for the Direct Access File System (DAFS) protocol 318, the NFS protocol 320, the CIFS protocol 322 and the HTTP protocol 324.

A virtual interface ("VI") layer 326 implements the VI architecture to provide direct access transport (DAT) capabilities, such as RDMA (Remote Direct Memory Access), as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 102.

The storage server 365 includes a file system module 302 in cooperating relation with a volume stripped module (VSM) 370, a RAID system module 380 and a disk driver system module 390.

The VSM 370 illustratively implements a striped volume set (SVS). The VSM 370 cooperates with the file system 302 to enable storage server 365 to service a volume of the SVS. In one embodiment, VSM 370 may also implement the SVS related process steps described above with respect to FIG. 1A.

The RAID system 380 manages the storage and retrieval of information to and from the volumes/disks in accordance with I/O operations, while the disk driver system 390 implements a disk access protocol such as, e.g., the SCSI protocol. The file system 302 implements a virtualization system of the storage operating system 206 through the interaction with one or more virtualization modules illustratively embodied as, e.g., a virtual disk (vdisk) module (not shown) and a SCSI target module 335. The SCSI target module 335 is generally disposed between the FC and iSCSI drivers 330, 328 and the file system 302 to provide a translation layer of the virtualization system between the block (lun) space and the file system space, where luns are represented as blocks.

The file system 302 is illustratively a message-based system that provides logical volume management capabilities for use in access to the information stored on the storage devices, such as disks. That is, in addition to providing file system semantics, the file system 302 provides functions normally associated with a volume manager. These functions include (i) aggregation of the disks, (ii) aggregation of storage bandwidth of the disks, and (iii) reliability guarantees, such as mirroring and/or parity (RAID).

The file system 302 illustratively may implement the write-anywhere file system having an on-disk format representation that is block-based using, e.g., 4 kilobyte (KB) blocks and using index nodes ("inodes") to identify data containers and data container attributes (such as creation time, access permissions, size and block location and OpLock). The file system uses data containers to store meta-data describing the layout of its file system; these meta-data data containers include, among others, an inode data container. A data container handle, i.e., an identifier that includes an inode number (inum), may be used to retrieve an inode from disk.

Broadly stated, all inodes of the write-anywhere file system are organized into the inode data container. A file system (fs) info block specifies the layout of information in the file system and includes an inode of a data container that includes all other inodes of the file system. Each logical volume (file system) has an fsinfo block that is preferably stored at a fixed location within, e.g., a RAID group. The inode of the inode data container may directly reference (point to) data blocks of the mode data container or may reference indirect blocks of the inode data container that, in turn, reference data blocks of the inode data container. Within each data block of the inode data container are embedded inodes, each of which may reference indirect blocks that, in turn, reference data blocks of a data container.

Operationally, a request from the client 114 is forwarded as a packet over the computer network 112 and onto the node 102 where it is received at the network adapter 210. A network driver processes the packet and, if appropriate, passes it on to a network protocol and file access layer for additional processing prior to forwarding to the write-anywhere file system 302. Here, the file system generates operations to load (retrieve) the requested data from disk 108 if it is not resident "in core", i.e., in memory 204.

If the information is not in memory 204, the file system 302 indexes into the inode data container using the inode number (inum) to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver 390 accesses the dbn from the specified disk 108 and loads the requested data block(s) in memory for processing by the node. Upon completion of the request, the node (and operating system) returns a reply to the client 114.

It should be noted that the software "path" through the operating system layers described above needed to perform data storage access for a client request received at node 102 may alternatively be implemented in hardware. That is, in an alternate embodiment of the disclosure, the storage access request data path may be implemented as logic circuitry embodied within a field programmable gate array (FPGA) or an ASIC. This type of hardware implementation increases the performance of the file service provided by node 102 in response to a file system request issued by client 114.

As used herein, the term "storage operating system" generally refers to the computer-executable code operable on a computer to perform a storage function that manages data access and may, in the case of a node 102, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

Figure 7:
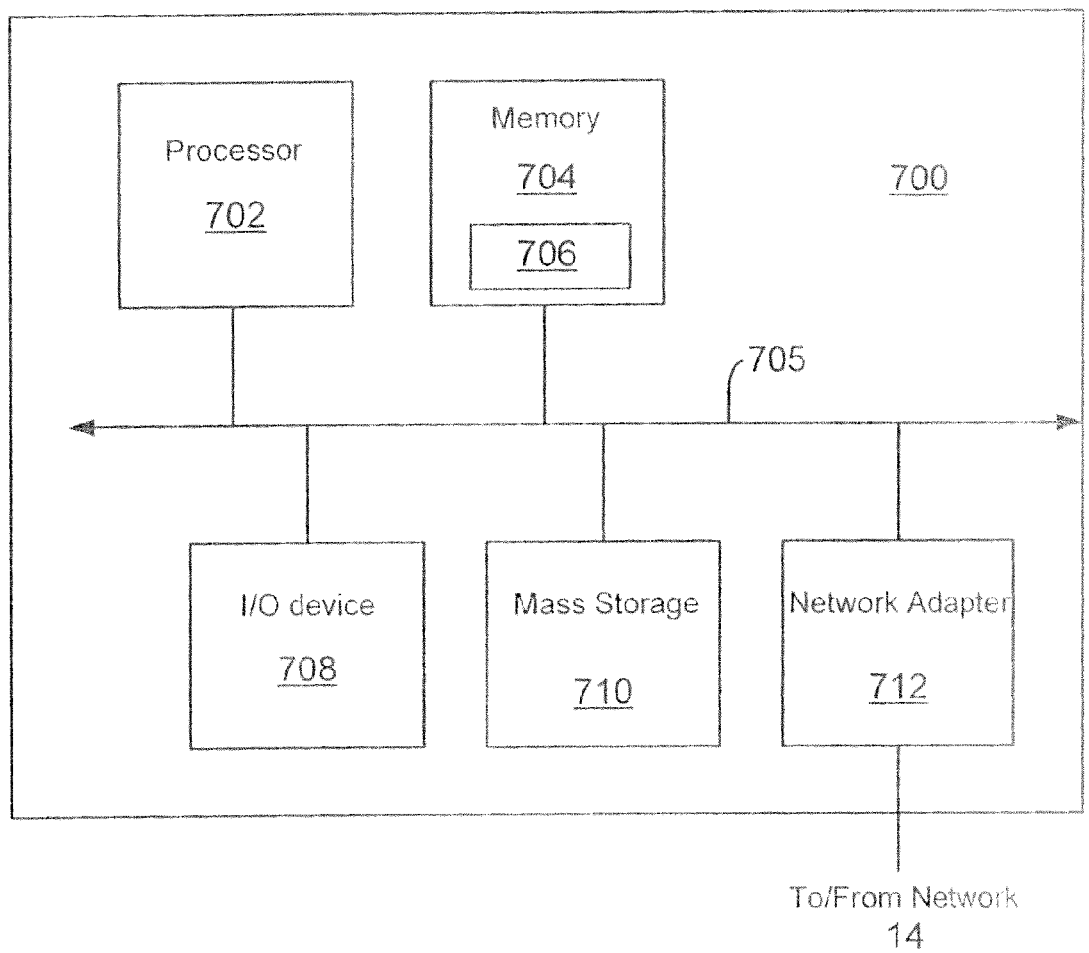
FIG. 7 shows a block diagram of a computing system for implementing the adaptive process of the present disclosure.

Processing System:

FIG. 7 is a high-level block diagram showing an example of the architecture of a processing system, at a high level, in which executable instructions for provisioning of storage space and non-disruptive migration can be implemented. The processing system 700 can represent management console 18, for example. Note that certain standard and well-known components which are not germane to the present invention are not shown in FIG. 7.

The processing system 700 includes one or more processors 702 and memory 704, coupled to a bus system 705. The bus system 705 shown in FIG. 7 is an abstraction that represents any one or more separate physical buses and/or point-to-point connections, connected by appropriate bridges, adapters and/or controllers. The bus system 705, therefore, may include, for example, a system bus, a Peripheral Component Interconnect (PCI) bus, a HyperTransport or industry standard architecture (ISA) bus, a small computer system interface (SCSI) bus, a universal serial bus (UBS), or an Institute of Electrical and Electronics Engineers (IEEE) standard 1394 bus (sometimes referred to as "Firewire").

The processors 702 are the central processing units (CPUs) of the processing system 700 and, thus, control its overall operation. In certain embodiments, the processors 702 accomplish this by executing programmable instructions stored in memory 704. A processor 702 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 704 represents any form of random access memory (RAM), read-only memory (ROM), flash memory, or the like, or a combination of such devices. Memory 704 includes the main memory of the processing system 700. Instructions 706 which implements the provisioning/migration technique introduced above (e.g., the storage management application 18 in FIG. 1B) may reside in and may be executed (by processors 702) from memory 704.

Also connected to the processors 702 through the bus system 705 are one or more internal mass storage devices 710, and a network adapter 712. Internal mass storage devices 710 may be or may include any conventional medium for storing large volumes of data in a non-volatile manner, such as one or more magnetic or optical based disks. The network adapter 712 provides the processing system 700 with the ability to communicate with remote devices (e.g., storage servers 20) over a network and may be, for example, an Ethernet adapter, a FC adapter, or the like. The processing system 700 also includes one or more input/output (I/O) devices 708 coupled to the bus system 705. The I/O devices 708 may include, for example, a display device, a keyboard, a mouse, etc.

Thus, a method and apparatus for provisioning and processing migration requests have been described. Note that references throughout this specification to "one embodiment" or "an embodiment" mean that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

The various embodiments described herein have numerous advantages over existing migration technologies. For example, the use (i.e. client) is removed from the configuration process for non-disruptive migration. Since the configuration is performed by a management application, different and optimum technologies are used to perform the migration. Users don't need to learn new migration technologies because the management application will select the optimum technology depending on access and destination locations.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A machine implemented method for processing a migration request received from a client to migrate information from a first storage to a second storage, comprising:
   determining an access protocol used by the client to access the first storage;
   in response to the migration request, automatically determining if a storage system that manages the first storage is capable of supporting non-disruptive migration of information from the first storage to the second storage; and
   automatically selecting a migration technique for migrating the information from the first storage to the second storage, when the storage system is capable of supporting non-disruptive migration, otherwise the information is migrated using disruptive migration; wherein a management application determines if a license for the migration technique is available for non-disruptive migration of information from the first storage to the second storage.

2. The method of claim 1, wherein based on a provisioning request from the client, the first storage is configured by a management application that determines if the storage system is capable of supporting non-disruptive migration.

3. The method of claim 1, further comprising:
   determining if non-disruptive migration is possible, if the storage system is capable of non-disruptive migration.

4. The method of claim 1, wherein if the first storage is a part of a cluster, then a management application creates a namespace for the cluster to non-disruptively migrate information from the first storage.

5. The method of claim 1, wherein if the first storage is a part of a non-cluster storage system using Network File System (NFS) or iSCSI as the access protocol, then a virtual storage system is used to non-disruptively migrate the information.

6. A machine readable non-transitory computer usable storage medium storing executable instructions, which when executed by a machine, causes the machine to perform a method for processing a migration request received from a client to migrate information from a provisioned first storage to a second storage, the method comprising:
   determining an access protocol used by the client to access the first storage;
   in response to the migration request, automatically determining if a storage system that manages the first storage is capable of supporting non-disruptive migration of information from the first storage to the second storage;
   determining whether non-disruptive migration is possible, if the storage system is capable of supporting non-disruptive migration; and
   automatically selecting a migration technique for migrating the information from the first storage to the second storage, when non-disruptive migration is possible and the storage system is capable of supporting non-disruptive migration, otherwise the information is migrated using disruptive migration; wherein a management application determines if a license for the migration technique is available for non-disruptive migration of information from the first storage to the second storage.

7. The storage medium of claim 6, wherein based on a provisioning request from the client, the first storage is configured by a management application that determines if non-disruptive migration is possible from the first storage to the second storage.

8. The storage medium of claim 7, wherein if the first storage is a part of a cluster, then the management application creates a namespace for the cluster to non-disruptively migrate information from the first storage.

9. The storage medium of claim 6, wherein if the storage system is not capable of non-disruptive migration, then information is disruptively migrated to the second storage.

10. The storage medium of claim 6, wherein if the first storage is a part of a non-cluster storage system using Network File System (NFS) or iSCSI as the access protocol, then a virtual storage system is used to non-disruptively migrate the information.

11. A computer program product, comprising:
   a computer usable non-transitory storage medium having computer readable instructions embodied therein for processing a migration request received from a client to migrate information from a provisioned first storage to a second storage, comprising:

instructions for determining an access protocol used by the client to access the first storage;

instructions for automatically determining if a storage system that manages the first storage is capable of supporting non-disruptive migration of information from the first storage to the second storage;

instructions for determining whether non-disruptive migration is possible, if the storage system is capable of supporting non-disruptive migration; and instructions for automatically selecting a migration technique for migrating the information from the first storage to the second storage, when non-disruptive migration is possible and the storage system is capable of non-disruptive migration, otherwise the information is migrated using disruptive migration; wherein a management application determines if a license for the migration technique is available for non-disruptive migration of information from the first storage to the second storage.

12. The computer program product of claim 11, wherein based on a provisioning request from the client, the first storage is configured by a management application that determines if non-disruptive migration is possible from the first storage to the second storage.

13. The computer program product of claim 12, wherein if the first storage is a part of a cluster, then the management application creates a namespace for the cluster to non-disruptively migrate information from the first storage.

14. The computer program product of claim 11, wherein if the storage system is not capable of non-disruptive migration, then information is disruptively migrated to the second storage.

15. The computer program product of claim 11, wherein if the first storage is a part of a non-cluster storage system using Network File System (NFS) or iSCSI as the access protocol, then a virtual storage system is used to non-disruptively migrate the information.

16. A machine implemented method for provisioning storage for non-disruptive migration in response to a client request, comprising:

evaluating the client request and determining an access protocol used by the client to access the storage;

determining if a storage system that manages the storage is capable of supporting non-disruptive migration of information from the storage; and automatically configuring the storage for non-disruptive migration, when the storage system is capable of supporting non-disruptive migration, otherwise using disruptive migration for migrating information from the storage system; wherein a management application determines if a license for a migration technique is available for non-disruptive migration of information from the first storage to the second storage.

17. The method of claim 16, wherein in response to the client request, a management application scans a resource pool and selects a storage that best matches the client request.

18. The method of claim 17, wherein the management application provides a user an option to relinquish non-disruptive migration.

19. A computing system for processing a migration request received from a client to migrate information from a provisioned first storage to a second storage, comprising:

a processor executing instructions for providing a graphical user interface on a display device to a user for submitting the migration request; wherein based on the migration request, the processor executing instructions determines an access protocol used by the client to access the first storage; determines whether the storage system is capable of supporting non-disruptive migration; and then automatically selects a migration technique for migrating the information from the first storage to the second storage, when the storage system is capable of supporting non-disruptive migration, otherwise the information is migrated using disruptive migration; wherein a management application determines if a license for the migration technique is available for non-disruptive migration of information from the first storage to the second storage.

20. The computing system of claim 19, wherein if the first storage is a part of a non-cluster storage system using Network File System (NFS) or iSCSI as the access protocol, then a virtual storage system is used to non-disruptively migrate the information.

* * * * *